(12) United States Patent
Lin et al.

(10) Patent No.: US 10,892,927 B2
(45) Date of Patent: Jan. 12, 2021

(54) SYSTEM AND METHOD FOR CONFIGURING MEASUREMENT GAPS AND REFERENCE SIGNALS

(71) Applicant: Huawei Technologies Co., Ltd., Shenzhen (CN)

(72) Inventors: Yicheng Lin, Ottawa (CA); Keyvan Zarifi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/101,100

(22) Filed: Aug. 10, 2018

(65) Prior Publication Data

US 2020/0052942 A1  Feb. 13, 2020

(51) Int. Cl.
| | | |
|---|---|---|
| H04L 27/26 | (2006.01) |
| H04W 76/11 | (2018.01) |
| H04L 5/00 | (2006.01) |
| H04L 1/00 | (2006.01) |
| H04W 8/28 | (2009.01) |
| H04W 72/04 | (2009.01) |

(52) U.S. Cl.
CPC ........ *H04L 27/2611* (2013.01); *H04L 1/0058* (2013.01); *H04L 5/0048* (2013.01); *H04W 8/28* (2013.01); *H04W 72/0453* (2013.01); *H04W 76/11* (2018.02)

(58) Field of Classification Search
CPC . H04L 27/2611; H04L 5/0048; H04L 1/0058; H04W 72/0453; H04W 76/11; H04W 8/28
See application file for complete search history.

(56) References Cited

U.S. PATENT DOCUMENTS

| | | | |
|---|---|---|---|
| 2015/0078272 A1* | 3/2015 | Kim ...................... H04L 5/0005 370/329 |
| 2018/0220407 A1* | 8/2018 | Xiong ..................... H04L 5/001 |
| 2019/0327057 A1 | 10/2019 | Wu et al. |

FOREIGN PATENT DOCUMENTS

| | | |
|---|---|---|
| CN | 108260219 A | 7/2018 |
| CN | 108270711 A | 7/2018 |

OTHER PUBLICATIONS

Huawei, et al., "Intra and inter frequency measurement definition in multiple reference signal transmission scenario", 3GPP TSG-RAN WG4 Meeting NR#3, R1-1709626, Sep. 18-21, 2017, 5 pages, Nagoya, Japan.

* cited by examiner

Primary Examiner — Walter J Divito
(74) Attorney, Agent, or Firm — Slater Matsil, LLP

(57) ABSTRACT

A method operating an access node includes determining a sequence of resource locations of a reference signal in accordance with resource identifying information and network identifying information, wherein at least a subset of resource locations in the sequence of resource locations changes, and sending, by the access node, the reference signal in accordance with the sequence of resource locations.

38 Claims, 8 Drawing Sheets

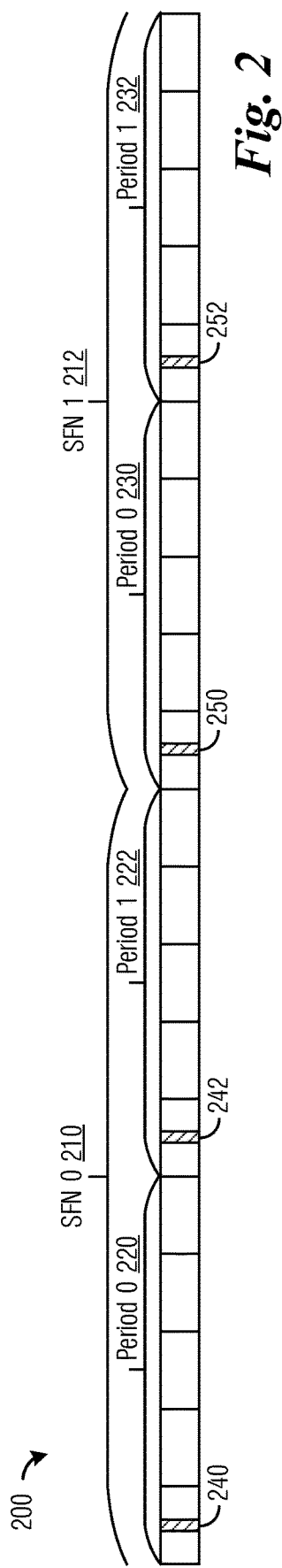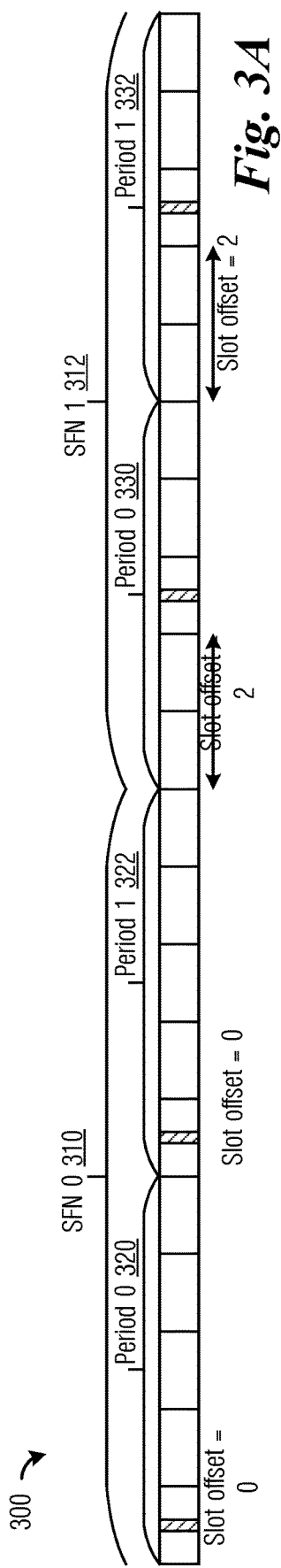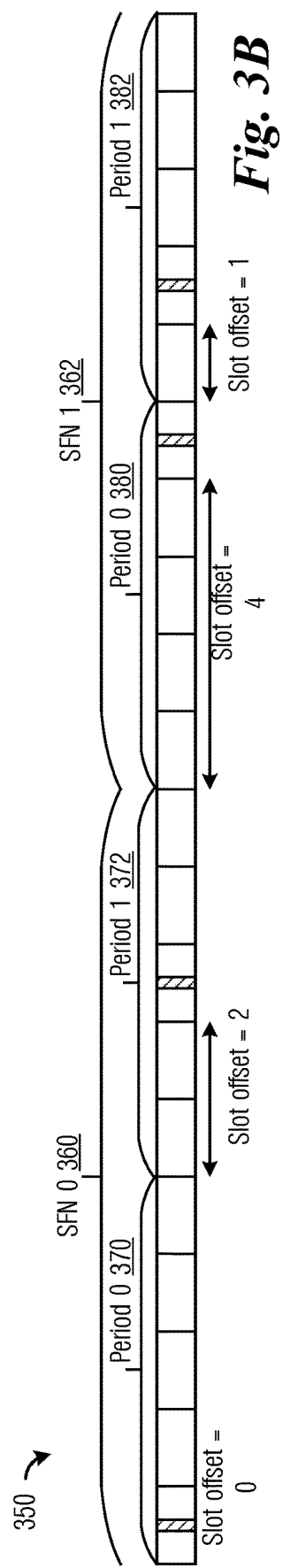

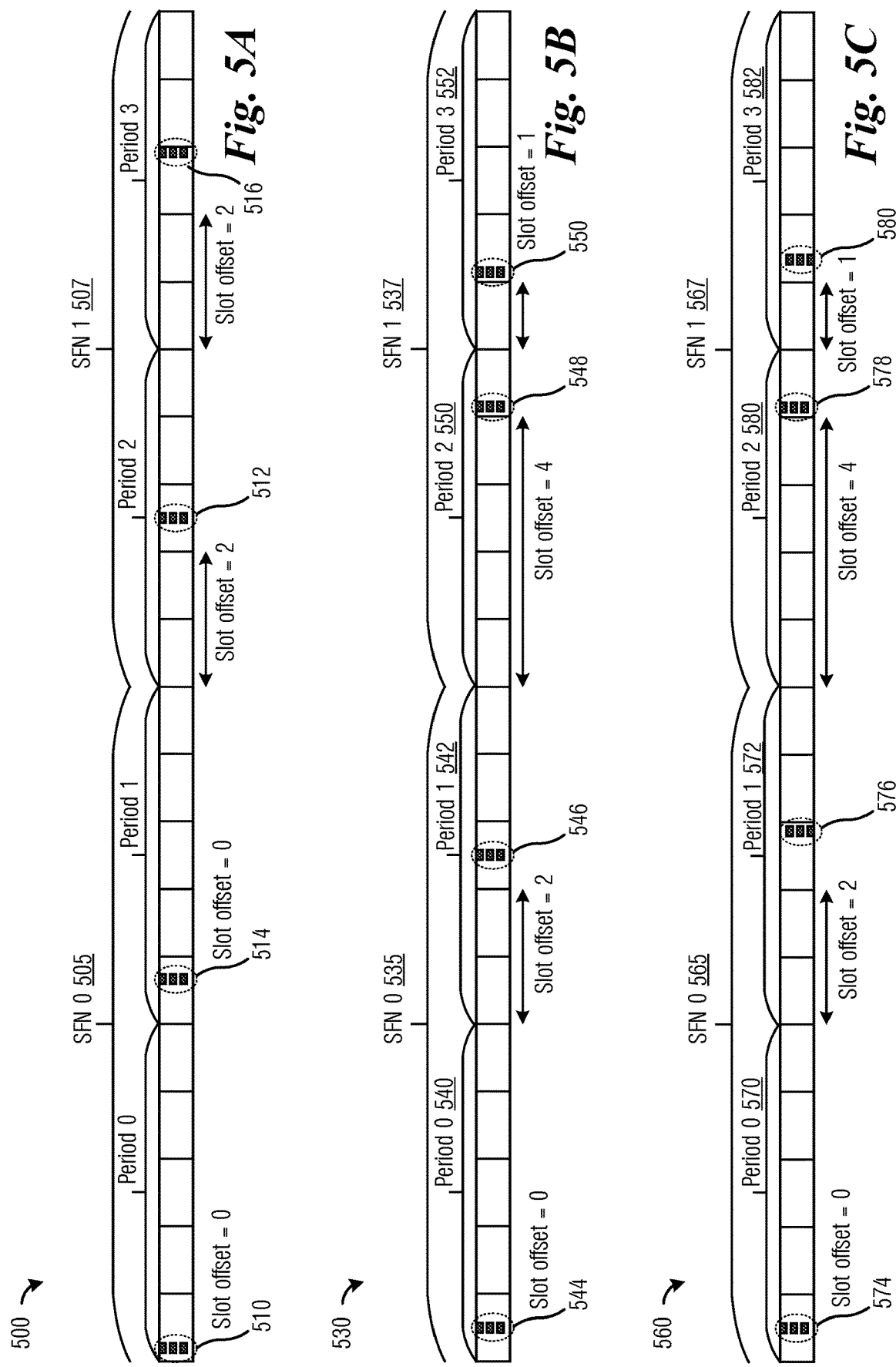

SYSTEM AND METHOD FOR CONFIGURING MEASUREMENT GAPS AND REFERENCE SIGNALS

TECHNICAL FIELD

The present disclosure relates generally to a system and method for digital communications, and, in particular embodiments, to a system and method for configuring measurement gaps (MGs) and reference signals.

BACKGROUND

One possible deployment scenario for fifth generation (5G) New Radio (NR) system architecture uses 6 gigahertz (GHz) and above, such as millimeter wavelength (mm-Wave), operating frequencies to exploit greater available bandwidth and less interference then what is available at the congested lower frequencies.

Communications system designers continue to add new mechanisms to communications systems to support larger numbers of users and to meet the ever increasing demand for greater data rates. Device mobility is an important feature to support in modern wireless communications systems because it allows users to continue receiving service as the users move about a wireless communications system.

Channel state information reference signals (CSI-RSs) are transmitted by access nodes to perform beam management, CSI acquisition, time refinement, phase adjustment, frequency adjustment, Layer 3 (L3) mobility measurement, and other purposes. Interference to the CSI-RS due to overlap with other reference, control, or data signals may be detrimental.

Measurement gaps (MGs) are silent periods scheduled by a cell serving a UE, during which there are no uplink or downlink data or control signaling scheduled for the UE. The UE can use the MGs to perform signal quality measurements of neighboring cells. This task may be performed by measuring CSI-RS for L3 mobility measurement transmitted by the neighboring cells, for example. Because no data or control transmissions or receptions are expected for the UE during a MG, the duration of the MGs significantly impact the performance of the UE. Therefore, there is a need for systems and methods for configuring measurement gaps and reference signals.

SUMMARY

Example embodiments provide a system and method for configuring measurement gaps (MGs) and reference signals.

In accordance with an example embodiment, a computer-implemented method for operating an access node is provided. The method includes determining, by the access node, a sequence of resource locations of a reference signal in accordance with resource identifying information and network identifying information, wherein at least a subset of resource locations in the sequence of resource locations changes, and sending, by the access node, the reference signal in accordance with the sequence of resource locations.

Optionally, in any of the preceding embodiments, an embodiment wherein a subset of the resource locations in the sequence of resource locations changes.

Optionally, in any of the preceding embodiments, an embodiment wherein the resource location comprises a location in at least one of a time domain or a frequency domain.

Optionally, in any of the preceding embodiments, an embodiment wherein the resource identifying information includes at least one of time resource identifying information or frequency resource identifying information.

Optionally, in any of the preceding embodiments, an embodiment wherein the time resource identifying information includes at least one of a frame number, a period number, a symbol number within a slot, or a time slot number within a frame, and wherein the frequency resource identifying information includes at least one of a physical resource block (PRB) number, frequency band number, or a subcarrier number.

Optionally, in any of the preceding embodiments, an embodiment wherein the network identifying information includes at least one of a cell identifier, a user equipment (UE) identifier, a media access control (MAC) identifier, or a temporary mobile subscriber identity (TMSI).

Optionally, in any of the preceding embodiments, an embodiment wherein the sequence of resource locations is further determined in accordance with a parameter, and wherein the method further includes configuring, by the access node, the parameter, and sending, by the access node, the parameter to a UE.

Optionally, in any of the preceding embodiments, an embodiment wherein each resource location in the sequence of resource locations includes a time domain location relative to a time domain reference point, and wherein the parameter includes a time domain parameter.

Optionally, in any of the preceding embodiments, an embodiment wherein the time domain reference point is one of a start of a reference signal period, a specified frame number of a primary or secondary serving cell, or a frame number zero of the primary or secondary serving cell.

Optionally, in any of the preceding embodiments, an embodiment wherein each resource location in the sequence of resource locations includes a frequency domain location relative to a frequency domain reference point, and wherein the parameter includes a frequency domain parameter.

Optionally, in any of the preceding embodiments, an embodiment wherein the frequency domain reference point is one of a reference PRB, a PRB zero that is a parameter in a serving cell configuration, a reference frequency location, or a synchronization signal block (SSB) location in a frequency domain.

Optionally, in any of the preceding embodiments, an embodiment wherein each resource location in the sequence of resource locations includes time domain location relative to a time domain reference point, and a frequency domain location relative to a frequency domain reference point, and wherein the parameter includes a time domain parameter and a frequency domain parameter.

Optionally, in any of the preceding embodiments, an embodiment wherein the reference signal includes at least one of a channel state information reference signal (CSI-RS) for Layer 3 mobility measurement, a CSI-RS for beam management, a CSI-RS for CSI acquisition, a CSI-RS for time refinement, a CSI-RS for phase adjustment, or a CSI-RS for frequency adjustment.

In accordance with an example embodiment, a method for operating a UE is provided. The method includes determining, by the UE, a sequence of resource locations of a reference signal in accordance with resource identifying information and network identifying information, wherein at least a subset of resource locations in the sequence of resource locations changes, and receiving, by the UE, the reference signal in accordance with the sequence of resource locations.

Optionally, in any of the preceding embodiments, an embodiment wherein the resource location comprises a location in at least one of a time domain or a frequency domain.

Optionally, in any of the preceding embodiments, an embodiment wherein a subset of the resource locations in the sequence of resource locations changes.

Optionally, in any of the preceding embodiments, an embodiment wherein the resource identifying information includes at least one of time resource identifying information or frequency resource identifying information.

Optionally, in any of the preceding embodiments, an embodiment wherein the time resource identifying information includes at least one of a frame number, a period number, a symbol number within a slot, or a time slot number within a frame, and wherein the frequency resource identifying information includes at least one of a PRB number, a frequency band number, or a subcarrier number.

Optionally, in any of the preceding embodiments, an embodiment wherein the network identifying information includes at least one of a cell identifier, a UE identifier, a MAC identifier, or a TMSI.

Optionally, in any of the preceding embodiments, an embodiment further includes receiving, by the UE, a parameter from an access node, wherein the sequence of resource locations is further determined in accordance with the parameter.

Optionally, in any of the preceding embodiments, an embodiment wherein each resource location in the sequence of resource locations comprises a time domain location relative to a time domain reference point, and wherein the parameter comprises a time domain parameter.

Optionally, in any of the preceding embodiments, an embodiment wherein the time domain reference point is one of a start of a reference signal period, a specified frame number of a primary or secondary serving cell, or a frame number zero of the primary or secondary serving cell.

Optionally, in any of the preceding embodiments, an embodiment wherein each resource location in the sequence of resource locations comprises a frequency domain location relative to a frequency domain reference point, wherein the parameter comprises a frequency domain parameter.

Optionally, in any of the preceding embodiments, an embodiment wherein the frequency domain reference point is one of a reference PRB, a PRB zero that is a parameter in a serving cell configuration, a reference frequency location, or a SSB location in a frequency domain.

Optionally, in any of the preceding embodiments, an embodiment wherein each resource location in the sequence of resource locations comprises a time domain location relative to a time domain reference point, and a frequency domain location relative to a frequency domain reference point, and wherein the parameter comprises a time domain parameter and a frequency domain parameter.

Optionally, in any of the preceding embodiments, an embodiment wherein the reference signal comprises at least one of a CSI-RS for Layer 3 mobility measurement, a CSI-RS for beam management, a CSI-RS for CSI acquisition, a CSI-RS for time refinement, a CSI-RS for phase adjustment, or a CSI-RS for frequency adjustment.

In accordance with an example embodiment, a method for operating an access node is provided. The method includes determining, by the access node, a timing of reference signal resources transmitted by a neighbor cell, configuring, by the access node, a measurement gap (MG) with a MG duration that spans one of one or more instances of the reference signal resources transmitted by the neighbor cell, a time interval that includes a subset of consecutive instances of the reference signal resources transmitted by the neighbor cell, or a time interval that includes all reference signal resources transmitted by the neighbor cell, and sending, by the access node, the MG configuration to a UE.

Optionally, in any of the preceding embodiments, an embodiment wherein determining the timing includes determining the timing from serving cell timing.

Optionally, in any of the preceding embodiments, an embodiment wherein the MG duration is equal to the duration of at least one instance of a sequence of reference signal resources transmitted by the neighbor cell.

Optionally, in any of the preceding embodiments, an embodiment wherein the MG duration is equal to the duration of at least one instance of the reference signal resources transmitted by the neighbor cell plus a specified number of symbol durations on either side of the reference signal resources transmitted by the neighbor cell.

Optionally, in any of the preceding embodiments, an embodiment wherein determining the timing includes determining the timing from a synchronization signal block (SSB) transmitted by the neighbor cell, a primary serving cell, or a secondary serving cell.

Optionally, in any of the preceding embodiments, an embodiment wherein the MG duration is equal to a duration of all resources transmitted by the access node that overlaps the at least one instance of a sequence of reference signal resources transmitted by the neighbor cell.

Optionally, in any of the preceding embodiments, an embodiment wherein the MG duration is equal to a duration of all resources transmitted by the access node that overlaps the at least one instance of a sequence of reference signal resources transmitted by the neighbor cell plus a specified number of symbol durations on either side of the reference signal resources transmitted by the neighbor cell.

Optionally, in any of the preceding embodiments, the MG is repeated periodically.

In accordance with an example embodiment, an access node is provided. The access node includes a non-transitory memory storage comprising instructions, and one or more processors in communication with the memory storage. The one or more processors execute the instructions to determine a sequence of resource locations of a reference signal in accordance with resource identifying information and network identifying information, wherein at least a subset of resource locations in the sequence of resource locations changes, and send the reference signal in accordance with the sequence of resource locations.

Optionally, in any of the preceding embodiments, an embodiment wherein a subset of the resource locations in the sequence of resource locations changes.

Optionally, in any of the preceding embodiments, an embodiment wherein the resource location comprises a location in at least one of a time domain or a frequency domain.

Optionally, in any of the preceding embodiments, an embodiment wherein the sequence of resource locations is further determined in accordance with a parameter, and wherein the one or more processors further execute the instructions to configure the parameter, and send the parameter to a UE.

Optionally, in any of the preceding embodiments, an embodiment wherein each resource location in the sequence of resource locations comprises a time domain location relative to a time domain reference point, and wherein the parameter comprises a time domain parameter.

Optionally, in any of the preceding embodiments, an embodiment wherein each resource location in the sequence of resource locations comprises a frequency domain location relative to a frequency domain reference point, and wherein the parameter comprises a frequency domain parameter.

Optionally, in any of the preceding embodiments, an embodiment wherein each resource location in the sequence of resource locations comprises a time domain location relative to a time domain reference point, and a frequency domain location relative to a frequency domain reference point, and wherein the parameter comprises a time domain parameter and a frequency domain parameter.

Optionally, in any of the preceding embodiments, an embodiment wherein the time domain reference point is one of a start of a reference signal period, a specified frame number of a primary or secondary serving cell, or a frame number zero of the primary or secondary serving cell.

Optionally, in any of the preceding embodiments, an embodiment wherein the frequency domain reference point is one of a reference PRB, a PRB zero that is a parameter in a serving cell configuration, a reference frequency location, or a synchronization signal block (SSB) location in a frequency domain.

Optionally, in any of the preceding embodiments, an embodiment wherein the resource identifying information comprises at least one of time resource identifying information or frequency resource identifying information.

Optionally, in any of the preceding embodiments, an embodiment wherein the time resource identifying information includes at least one of a frame number, a period number, a symbol number within a slot, or a time slot number within a frame, and wherein the frequency resource identifying information includes at least one of a PRB number, frequency band number, or a subcarrier number.

Optionally, in any of the preceding embodiments, an embodiment wherein the network identifying information comprises at least one of a cell identifier, a UE identifier, a MAC identifier, or a TMSI.

Optionally, in any of the preceding embodiments, an embodiment wherein the reference signal includes at least one of a CSI-RS for Layer 3 mobility measurement, a CSI-RS for beam management, a CSI-RS for CSI acquisition, a CSI-RS for time refinement, a CSI-RS for phase adjustment, or a CSI-RS for frequency adjustment.

In accordance with an example embodiment, a UE is provided. The UE includes a non-transitory memory storage comprising instructions, and one or more processors in communication with the memory storage. The one or more processors execute the instructions to determine a sequence of resource locations of a reference signal in accordance with resource identifying information and network identifying information, wherein at least a subset of resource locations in the sequence of resource locations changes, and receive the reference signal in accordance with the sequence of resource locations.

Optionally, in any of the preceding embodiments, an embodiment wherein a subset of the resource locations in the sequence of resource locations changes.

Optionally, in any of the preceding embodiments, an embodiment wherein the one or more processors further execute the instructions to receive a parameter from an access node, wherein the sequence of resource locations is further determined in accordance with the parameter.

Optionally, in any of the preceding embodiments, an embodiment wherein each resource location in the sequence of resource locations comprises a time domain location relative to a time domain reference point, and wherein the parameter comprises a time domain parameter.

Optionally, in any of the preceding embodiments, an embodiment wherein each resource location in the sequence of resource locations comprises a frequency domain location relative to a reference point in frequency domain reference point, and wherein the parameter comprises a frequency domain parameter.

Optionally, in any of the preceding embodiments, an embodiment wherein each resource location in the sequence of resource locations comprises a time domain location relative to a time domain reference point, and a frequency domain location relative to a frequency domain reference point, wherein the parameter comprises a time domain parameter and a frequency domain parameter.

Optionally, in any of the preceding embodiments, an embodiment wherein the resource identifying information comprises at least one of time resource identifying information or frequency resource identifying information.

Optionally, in any of the preceding embodiments, an embodiment wherein the time domain reference point is one of a start of a reference signal period, a specified frame number of a primary or secondary serving cell, or a frame number zero of the primary or secondary serving cell.

Optionally, in any of the preceding embodiments, an embodiment wherein the frequency domain reference point is one of a reference PRB, a PRB zero that is a parameter in a serving cell configuration, a reference frequency location, or a synchronization signal block (SSB) location in a frequency domain.

Optionally, in any of the preceding embodiments, an embodiment wherein the time resource identifying information includes at least one of a frame number, a period number, a symbol number within a slot, or a time slot number within a frame, and wherein the frequency resource identifying information includes at least one of a PRB number, a frequency band number, or a subcarrier number.

Optionally, in any of the preceding embodiments, an embodiment wherein the network identifying information comprises at least one of a cell identifier, a UE identifier, a MAC identifier, or a TMSI.

In accordance with an example embodiment, an access node is provided. The access node includes a non-transitory memory storage comprising instructions, and one or more processors in communication with the memory storage. The one or more processors execute the instructions to determine a timing of reference signal resources transmitted by a neighbor cell, configure a MG with a MG duration that spans one of a time interval of the reference signal resources transmitted by the neighbor cell, one or more instances of the reference signal resources transmitted by neighbor cell, a time interval that includes all reference signal resources transmitted by the neighbor cell, or a time interval that includes a subset of consecutive instances of the reference signal resources transmitted by neighbor cell, and send the MG configuration to a UE.

Optionally, in any of the preceding embodiments, an embodiment wherein the one or more processors further execute the instructions to determine the timing from serving cell timing.

Optionally, in any of the preceding embodiments, an embodiment wherein the one or more processors further execute the instructions to determine the timing from a SSB transmitted by the neighbor cell, a primary serving cell, or a secondary serving cell.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 2 illustrates an example sequence of frames of a 3GPP NR compliant communications system, highlighting a configuration for CSI-RS for L3 mobility measurement;

FIG. 3A illustrates an example sequence of frames of a 3GPP NR compliant communications system, highlighting a configurable and dynamic slot offset that is specified to be a function of a configured parameter ds, resource identifying information, and network identifying information, where the slot offset changes on a per system frame number (SFN) basis according to example embodiments described herein;

FIG. 3B illustrates an example sequence of frames of a 3GPP NR compliant communications system, highlighting a configurable and dynamic slot offset that is specified to be a function of a configured parameter ds, resource identifying information, and network identifying information, where the slot offset changes on a per CSI-RS period basis according to example embodiments described herein;

FIG. 5A illustrates an example sequence of frames of a 3GPP NR compliant communications system, highlighting a configurable and dynamic RE time location and a configurable and dynamic slot offset that are specified to be a function of configured parameters, resource identifying information, and network identifying information, where the RE time location within a slot changes as a function of SFN and slot number within a frame, and the slot offset changes on a per SFN basis, according to example embodiments described herein;

FIG. 5B illustrates an example sequence of frames of a 3GPP NR compliant communications system, highlighting a configurable and dynamic RE location and a configurable and dynamic slot offset that are specified to be a function of configured parameters, resource identifying information, and network identifying information, where the RE time location within a slot changes on a per SFN basis, and the slot offset changes on a per CSI-RS period basis, according to example embodiments described herein;

FIG. 5C illustrates an example sequence of frames of a 3GPP NR compliant communications system, highlighting a configurable and dynamic RE time or frequency location within a slot and with a configurable and dynamic slot offset that are both specified as a function of configured parameters, resource identifying information, and network identifying information, where the RE time and frequency location within a slot changes as a function of SFN and slot number within a frame, and slot offset changes on a per CSI-RS period basis according to example embodiments described herein;

DETAILED DESCRIPTION OF ILLUSTRATIVE EMBODIMENTS

The making and using of the disclosed embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
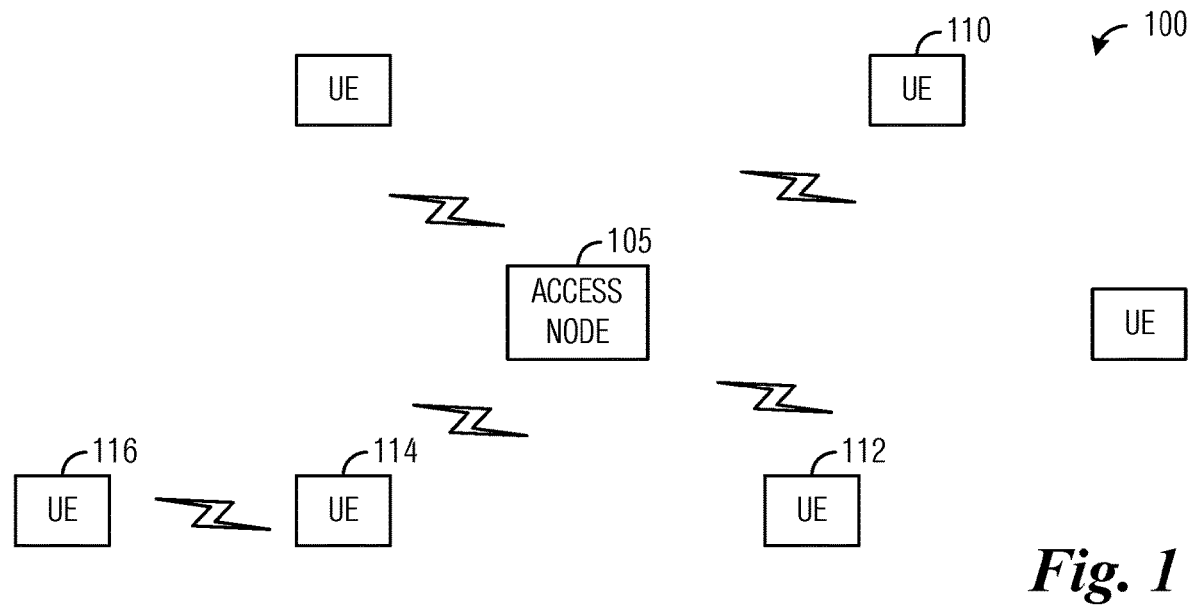
FIG. 1 illustrates an example wireless communications system according to example embodiments described herein.

FIG. 1 illustrates an example wireless communications system 100. Communications system 100 includes an access node 105 serving a plurality of UEs, such as UEs 110, 112, 114, and 116. In a cellular operating mode, communications to and from the plurality of UEs go through access node 105, while in device to device communications mode, such as proximity services (ProSe) operating mode, for example, direct communication between UEs is possible. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., long term evolution (LTE), LTE advanced (LTE-A), 5G NR, High Speed Packet Access (HSPA), Wi-Fi 802.11a/b/g/n/ac/ad/ax/ay, etc. While it is understood that communications systems may employ multiple eNBs capable of communicating with a number of UEs, only one eNB, and a number of UEs are illustrated for simplicity.

In some embodiments, a UE may be served by a plurality of cells. In such a situation, one of the cells is referred to as a primary serving cell, and the remaining cells are referred to as secondary serving cells.

In the Third Generation Partnership Project (3GPP) New Radio (NR) family of technical standards, a channel state information reference signal (CSI-RS) is defined for Layer 3 (L3) mobility measurement. The CSI-RS for L3 mobility measurement is a single port CSI-RS and comprises of resources, such as resource elements (REs), in a single symbol per slot. The location of the CSI-RS slot and the time/frequency location of CSI-RS resources within the slot for L3 mobility measurement are configurable and are specified in the technical standards. The use of a single port limits the diversity of the CSI-RS for L3 mobility measurement. FIG. 2 illustrates an example sequence of frames 200 of a 3GPP NR compliant communications system, highlighting a configuration for CSI-RS for L3 mobility measurement. As shown in FIG. 2, sequence of frames 200 comprises at least two frames, with each frame having a system frame number (SFN), such as frames SFN 0 210 and SFN 1 212. Each frame comprises two periods (in this example each period is a subframe in duration), period 0 and period 1. As an example, frame SFN 0 210 includes period 0 220 and period 1 222, while frame SFN 1 212 includes period 0 230 and period 1 232. Each period includes five slots, numbered 0 to 4. It is noted that in FIG. 2, time is the horizontal axis and frequency is the vertical axis.

Although the discussion presented herein focuses on CSI-RSs for L3 mobility measurement, the example embodiments presented are operable for other types of CSI-RS or other types of reference signals or non-reference signals. As an example, other types of CSI-RS include CSI-RS for beam management, CSI-RS for CSI acquisition, CSI-RS for time refinement, CSI-RS for phase adjustment, or CSI-RS for frequency adjustment. Therefore, the discussion of CSI-RS for L3 mobility measurement should not be construed as being limiting to the scope or spirit of the example embodiments.

According to the 3GPP NR family of technical standards, one CSI-RS symbol for L3 mobility management in one slot per frame includes one or more resources. The location of the one or more CSI-RS resources within the slot can be configured by the technical standard, a network device, or an operator of the communications system. Once configured, the location of the one or more CSI-RS resources remains fixed until reconfiguration. In general, there are several configurable parameters for CSI-RS symbol for L3 mobility management locations: 1) periodicity (e.g., number of slots); 2) slot offset (e.g., an offset number of slots in each period); and 3) time domain or frequency domain location within a slot. For sequence of frame 200 of FIG. 2, the periodicity is 5 slots, and the slot offset for all 4 CSI-RS symbols for L3 mobility measurement is 0. The frequency domain location is not shown in FIG. 2. As shown in FIG. 2, the CSI-RS for L3 mobility measurement is located in symbol 240 for period 0 220 of SFN 0 210 and symbol 242 for period 1 222 of SFN 0 210, and in symbols 250 and 252 of SFN 1 212. It is noted that a slot offset for the symbols including the CSI-RS for L3 mobility measurement is the same for all periods of all frames. Due to the use of a single symbol per slot, CSI-RS for L3 mobility is more vulnerable to interference if it overlaps with other cells' resources in the communications system, such as synchronization signal blocks (SSBs), data channels, control channels, as well as CSI-RS for L3 mobility measurement transmitted by other cells. Additionally, the CSI-RS for L3 mobility measurement may also collide with its own cell's resources, such as SSBs, data channels, control channels, etc. And because the location of the resource of the CSI-RS for L3 mobility measurement is fixed after configuration, it is possible to collide with other cells' or its own cell's periodic resources of the same periodicity, such that they are likely to repeatedly collide in every cycle. Also, because there is no rate matching performed around target neighboring cells CSI-RS for L3 mobility measurement resources, interference issues may arise for the CSI-RS for L3 mobility measurement.

Furthermore, for operation below 6 GHz with non-beamformed transmission, collision of CSI-RS for L3 mobility measurement resources with other resources degrade the CSI-RS measurement performance due to interference. For operation above 6 GHz with beamformed transmission, collision of CSI-RS for L3 mobility measurement resources with other resources with different spatial quasi-co-located (QCL) assumptions means that they generally cannot be measured within one receiving beam, potentially leading to longer measurement times as another different beam may be needed for detection in another measurement instance of the CSI-RS for L3 mobility measurement. QCL defines a relationship between two reference signals, control signals, or data signals such that the two signals may be viewed as possessing similar characteristics. Example characteristics include carrier frequency, spatial locations, time offset, frequency offset, spatial precoding vectors, and so on. Spatial QCL is a category of QCL with two precoded or beamformed signals that are precoded using the same or similar precoder. As an illustrative example, a first signal (a reference signal, control signal, or data signal, for example) and a second signal (a reference signal, control signal, or data signal, for example) are spatially QCLed if they are transmitted using the same spatial location. Hence, ways to mitigate the collision of the CSI-RS for L3 mobility measurement resources with other resources are needed.

According to an example embodiment, a system and method where a sequence of relative locations of a CSI-RS for L3 mobility measurement resources changes over time is provided. A relative location of a CSI-RS in the sequence of relative locations is a location of a CSI-RS resource (as specified by a time domain location, or a frequency domain location) in a cycle specified with respect to a time domain reference point, a frequency domain reference point, or both a time domain reference point and a frequency domain reference point. In an embodiment, a resource location may include a relative location. In an embodiment, a combination of the reference point and the relative location yields a resource location of the CSI-RS resource. For example, the relative location may be added or subtracted from the reference point to obtain the resource location. In some cases, the combination of the reference point and the relative location may result in a resource location that is out of limits (with respect to the period or the frequency range of the CSI-RS for L3 mobility measurement). In such a situation a roll-over may be implemented to ensure that the resource location is within limits.

Examples of a time domain reference point includes a beginning of a frame or slot, a CSI-RS period in time, a start of a reference signal period, a specified frame number of a primary or secondary serving cell, or a frame number zero of the primary or secondary serving cells. Examples of a frequency domain reference point includes a reference PRB, a PRB zero that is a parameter in a serving cell configuration, a reference frequency location, a synchronization signal block location in the frequency domain, or with respect to the beginning point in the frequency domain. The sequence of relative locations of the CSI-RS for L3 mobility measurement may be time-based locations (such as slot numbers, symbol numbers, period numbers, etc.), frequency-based locations (such as physical resource block (PRB) locations or numbers, frequency band locations or numbers, subcarrier locations or numbers, etc.), or a combination of time and frequency based locations. Because the relative locations of the CSI-RS for L3 mobility measurement resources changes over time, the probability of collision with other resources in the communications system is reduced, especially with other periodic signals of the same periodicity. The sequence of relative locations of the CSI-RS for L3 mobility measurement may be the slot offsets, symbol offsets, PRB locations or numbers, frequency band locations or numbers, subcarrier locations or numbers and so on, for symbols that includes the CSI-RS for L3 mobility measurement.

The CSI-RS for L3 mobility measurement may be a persistent reference signal or a semi-persistent reference signal. The example embodiments presented herein are operable for either persistent or semi-persistent reference or non-reference signals.

Practice of the foregoing embodiments enables randomness in the location of reference signal resources, such as CSI-RS for mobility resources, so that the location of the reference signal resources changes between different reference signal appearances. The randomness in the location of the reference signal resources helps mitigate collisions between the reference signal and other reference signals (such as SSBs), as well as control signals or data signals, especially collisions with other repetitive resources with the same periodicity.

In an embodiment, the sequence of locations of the CSI-RS for L3 mobility measurement resources are relative to a configured period and locations of the CSI-RS for L3 mobility measurement resources. In general, a CSI-RS for L3 mobility measurement has a configured period and location within the time domain or frequency domain. If randomness is not introduced to the locations of the CSI-RS for L3 mobility measurement resources, the CSI-RS for L3 mobility measurement resources will always occur at the same locations (in terms of time or frequency), relative to the periodicity of the CSI-RS for L3 mobility measurement. However, randomness may be introduced by changing an offset relative to the configured locations of the CSI-RS for L3 mobility measurement, for example. As an example, a time domain offset may be introduced to change the time domain location of a CSI-RS for L3 mobility measurement resource. The time domain offset may be positive or negative values. As another example, a frequency domain offset may be introduced to change the frequency domain location of a CSI-RS for L3 mobility measurement resource. The frequency domain offset may be positive or negative values. As yet another example, both a time domain offset and a frequency domain offset may be introduced to change the time and frequency domain locations of a frequency domain offset. The time domain offset and the frequency domain offset may be any combination of positive or negative values. The randomized locations of the CSI-RS for L3 mobility measurement resources are referred to as a sequence of relative locations.

In an embodiment, the sequence of locations of the CSI-RS for L3 mobility measurement resources is determined in accordance with resource identifying information, such as time resource identifying information, frequency resource identifying information, or both time and frequency resource identifying information. Examples of time resource identifying information include frame number (e.g., SFN), period number (e.g., CSI-RS period number (CPN), the index of appearances of CSI-RS), symbol number within a slot, time slot number within a frame, and so on. It is noted that the CPN may be implemented as a counter from 0 to a maximum number of CSI-RS periods minus 1, for example. Examples of frequency resource identifying information include PRB location or number, frequency band location or number, subcarrier location or number, and so on.

In an embodiment, the sequence of locations of the CSI-RS for L3 mobility measurement resources is determined in accordance with network identifying information. Examples of network identifying information includes cell identifier, UE identifier, media access control (MAC) identifier, temporary mobile subscriber identity (TMSI), and so on. The incorporation of network identifying information in the determination of the sequence of locations of the RS for L3 mobility measurement resources enables potentially different sequence of locations of the CSI-RS for L3 mobility measurement resources for different UEs or UE groups.

In an embodiment, the sequence of locations of the CSI-RS for L3 mobility measurement resources is determined in accordance with a configured parameter. The parameter may be configured using radio resource control (RRC) messaging, for example. The parameter enables the network to have a role in specifying the sequence of locations of the CSI-RS for L3 mobility measurement resources. As an example, the network configures a different parameter value or values for different UEs or UE groups.

In an embodiment, the sequence of locations of the CSI-RS for L3 mobility measurement resources is determined in accordance with resource identifying information, and network identifying information.

In an embodiment, the sequence of locations of the CSI-RS for L3 mobility measurement resources is determined in accordance with resource identifying information, network identifying information, and one or more configured parameters. The combination of resource identifying information, network identifying information, and one or more configured parameters enables the specifying of the sequence of locations of the CSI-RS for L3 mobility measurement resources to differ for different UEs or UE groups while allowing the network to have a role in specifying the sequence of locations of the CSI-RS for L3 mobility measurement resources.

As an illustrative example, the slot offsets (an example of the relative location of the CSI-RS for L3 mobility measurement in the time domain) of the CSI-RS for L3 mobility measurement resources are specified to be a function of a configured time domain parameter ds, resource identifying information (e.g., the SFN, or the CPN), network identifying information (e.g., cell identifier, or UE identifier), and so on, so that a cell can configure a UE or UE group different slot offsets in adjacent frames or adjacent CSI-RS appearances (adjacent CSI-RS periods). The slot offsets may be combined with the configured locations for the CSI-RS for L3 mobility measurement resources to obtain time domain locations of randomized CSI-RS for L3 mobility measurement resources, for example. The slot offsets may be bounded by a maximum value or a minimum value, which are determined by a number of slots per period.

The changing of the slot offsets as function of configured time domain parameter, resource identifying information, and network identifying information, when combined with the configured locations for the CSI-RS for L3 mobility measurement resources, allows the relative locations of the CSI-RS resources to change between CSI-RS appearances, which help to decrease the probability of collision.

The use of slot offsets in the examples presented herein is for illustrative purposes only. The example embodiments are operable with any time domain resource, such as slot offsets, symbol offsets, frame offsets, and so on. Therefore, the discussion of slot offsets should not be construed as being limiting to the scope or the spirit of the example embodiments. Additionally, the slot offsets in the examples are positive slot offsets. The example embodiments are also operable with negative slot offset values, as well as negative values of other time domain resource offsets.

FIG. 3A illustrates an example sequence of frames 300 of a 3GPP NR compliant communications system, highlighting a configurable and dynamic slot offset that is specified to be a function of a configured time domain parameter ds, resource identifying information, and network identifying information, where the slot offset changes on a per SFN basis. It is noted that in FIG. 3A, time is the horizontal axis and frequency is the vertical axis. As shown in FIG. 3A, the slot offset is a function of SFN, so the slot offset does not change within a single SFN, but may change between different SFNs. For SFN 0 310, the slot offset is equal to 0 for both period 0 320 and period 1 322, while for SFN 1 312, the slot offset is equal to 2 for both period 0 330 and period 1 332. An example expression for the slot offset is as follows:

slot_offset=$fn$(ds,SFN,cell_ID,UE_ID,max_slot_offset)=mod($a$*SFN+$b$*cell_ID+$c$*UE_ID+$d$*(SFN+$d1$)*(cell_ID+$d2$)+$e$*(SFN+$e1$)*(UE_ID+$e2$)+$f$*(cell_ID+$f1$)*(UE_ID+$f2$)+$g$*(SFN+$g1$)*(cell_ID+$g2$)*(UE_ID+$g3$)+$h$+ds, max_slot_offset+1).

Where slot_offset is a number of time slots relative to a beginning of a period to a time slot that includes the CSI-RS for L3 mobility measurement, fn( ) denotes a mathematical function, ds is the configured time domain parameter, cell_ID is the cell identifier, UE_ID is the UE identifier, max_slot_offset is the maximum number of slots per CSI-RS period, modO is a mathematical function that returns a remainder of a division operation, and a, b, c, d, e, f, g, h, d1, d2, e1, e2, f1, f2, g1, g2, and g3 are constant numerical values. Some or all of the constant numerical values may also be configured by the network or specified in the technical standards.

FIG. 3B illustrates an example sequence of frames 350 of a 3GPP NR compliant communications system, highlighting a configurable and dynamic slot offset that is specified to be a function of a configured time domain parameter ds, resource identifying information, and network identifying information, where the slot offset changes on a per CSI-RS period basis. It is noted that in FIG. 3B, time is the horizontal axis and frequency is the vertical axis. As shown in FIG. 3B, the slot offset is a function of CSI-RS period, so the slot offset may change within a single SFN. For SFN 0 360, the slot offset is equal to 0 for CSI-RS period 0 370 and 2 for CSI-RS period 1 372, while for SFN 1 362, the slot offset is equal to 4 for CSI-RS period 0 380 and 1 for CSI-RS period 1 382. An example expression for the slot offset is as follows:

slot_offset=$fn$(ds,CPN,cell_ID,UE_ID,max_slot_offset)=mod($a$*CPN+$b$*cell_ID+$c$*UE_ID+$d$*(CPN+$d1$)*(cell_ID+$d2$)+$e$*(CPN+$e1$)*(UE_ID+$e2$)+$f$*(cell_ID+$f1$)*(UE_ID+$f2$)+$g$*(CPN+$g1$)*(cell_ID+$g2$)*(UE_ID+$g3$)+$h$+ds, max_slot_offset+1).

Where slot_offset is a number of time slots relative to a beginning of a period to a time slot that includes the CSI-RS for L3 mobility measurement, fn( ) denotes a mathematical function, ds is the configured time domain parameter, cell_ID is the cell identifier, UE_ID is the UE identifier, max_slot_offset is the maximum number of slots per CSI-RS period, mod(is a mathematical function that returns a remainder of a division operation, and a, b, c, d, e, f, g, h, d1, d2, e1, e2, f1, f2, g1, g2, and g3 are constant numerical values. Some or all of the constant numerical values may also be configured by the network or specified in the technical standards.

In addition to configuring CSI-RS period to the UE, the network may also configure the time domain parameter ds. Some or all of the constant numerical values a, b, c, d, e, f, g, h, d1, d2, e1, e2, f1, f2, g1, g2, and g3 may also be configured by the network or specified in the technical standards.

It is noted that with a dynamic relative location of the CSI-RS for L3 mobility measurement, the periodicity of the CSI-RS is not constant, with an actual time interval between any two CSI-RS symbols potentially being different from an average CSI-RS periodicity.

It is also noted that example expressions for slot offset presented herein are for discussion purposed only and that the example embodiments discussed here are operable with other ways for determining the slot offset. Therefore, the example expressions should not be construed as being limiting to the scope or spirit of the example embodiments.

As an illustrative example, the RE time or frequency locations (an example of the relative location of the CSI-RS for L3 mobility measurement in the time or frequency domains) of the CSI-RS for L3 mobility measurement resources are specified to be a function of a configured frequency domain parameter db or a time domain parameter d1, resource identifying information (e.g., the SFN, or the CPN), network identifying information (e.g., cell identifier, or UE identifier), and so on, so that a cell can configure a UE a different RE time or frequency location in adjacent frames or adjacent CSI-RS appearances (adjacent CSI-RS periods). The RE time or frequency locations may change in frequency, time, or both frequency and time. The RE time or frequency locations may be bounded by a maximum value or a minimum value, which are determined by a number of RE locations in time, frequency, or both time and frequency.

The changing of the RE time or frequency location as function of configured time or frequency domain parameter, resource identifying information, and network identifying information allows the relative location of the CSI-RS resources to change between CSI-RS appearances, which helps to decrease the probability of collision.

The use of RE time or frequency locations in the examples presented herein is for illustrative purposes only. The example embodiments are operable with any time or frequency domain resource, such as frame numbers, slot numbers, or symbol numbers, and so on, in the time domain, or PRB locations or numbers, frequency band locations or numbers, subcarrier locations or numbers, and so on in the frequency domain. The RE time locations may be relative to a reference slot, reference frame (e.g., frame zero), reference symbol, and so on. The RE frequency locations may be relative to a reference RE, reference PRB (e.g., PRB0), reference frequency, SSB frequency location, and so on. Therefore, the discussion of RE time or frequency locations should not be construed as being limiting to the scope or the spirit of the example embodiments.

Figure 4:
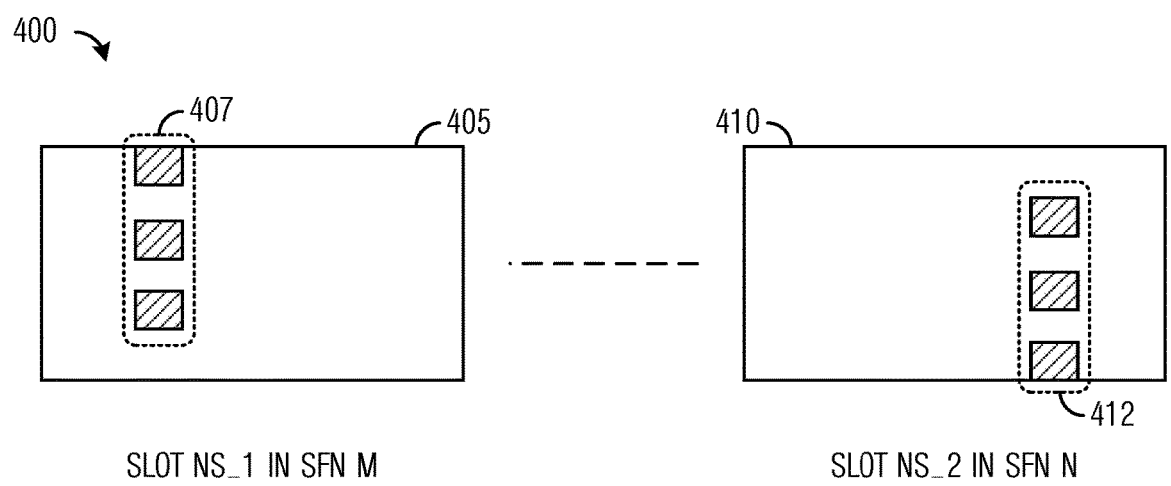
FIG. 4 illustrates an example time-frequency diagram of frames, highlighting a configurable and dynamic RE location within a slot that is specified to be a function of a configured parameter, resource identifying information, and network identifying information according to example embodiments described herein.

FIG. 4 illustrates an example time-frequency diagram of frames 400, highlighting a configurable and dynamic RE time or frequency location within a slot that is specified to be a function of a configured parameter, resource identifying information, and network identifying information. As shown in FIG. 4, in a SFN M 405, the CSI-RS for L3 mobility measurement are in REs 407, while in a SFN N 410, the CSI-RS for L3 mobility measurement are in REs 412. Between the two SFNs, the REs including the CSI-RS for L3 mobility measurement have changed in both time (OFDM symbol) and frequency (frequency band or subcarrier) domains. It is noted however, that in a different example embodiment, the REs may change in only time domain or frequency domain.

Hence, the RE time location may be expressed as a function of the configured time domain parameter d1, resource identifying information (e.g., slot index ns within a frame), and network identifying information (e.g., cell identifier, UE identifier). The network may configure different UEs with different RE time locations in adjacent CSI-RS appearances. An example expression for RE time location L0 where the RE time location changes on a frame basis is as follows:

$$L0=fn(dl,SFN,cell\_ID,UE\_ID,max\_time\_location)= \\ mod(a*SFN+b*cell\_ID+c*UE\_ID+d*(SFN+ \\ d1)* (cell\_ID+d2)+e*(SFN+e1)*(UE\_ID+e2)+f* \\ (cell\_ID+f1)*(UE\_ID+f2)+g*(SFN+g1)*(cell\_ID+g2)*(UE\_ID+g3)+h+dl, \\ max\_time\_location+1).$$

Where L0 is the RE time location, fn( ) denotes a mathematical function, dl is the configured time domain parameter, cell_ID is the cell identifier, UE_ID is the UE identifier, max_time_location is the maximum number of OFDM symbols per slot, mod( ) is a mathematical function that returns a remainder of a division operation, and a, b, c, d, e, f, g, h, d1, d2, e1, e2, f1, f2, g1, g2, and g3 are constant numerical values. Some or all of the constant numerical values may also be configured by the network or specified in the technical standards.

An example expression for RE time location L0 where the RE time location changes on a CSI-RS period basis is as follows:

$$L0=fn(dl,CPN,cell\_ID,UE\_ID,max\_time\_location)= \\ mod(a*CPN+b*cell\_ID+c*UE\_ID+d*(CPN+ \\ d1)* (cell\_ID+d2)+e*(CPN+e1)*(UE\_ID+e2)+f* \\ (cell\_ID+f1)*(UE\_ID+f2)+g*(CPN+g1)*(cell\_ID+g2)*(UE\_ID+g3)+h+dl, \\ max\_time\_location+1).$$

Where L0 is the RE time location, fn( ) denotes a mathematical function, dl is the configured time domain parameter, cell_ID is the cell identifier, UE_ID is the UE identifier, max_time_location is the maximum number of OFDM symbols per slot, mod( ) is a mathematical function that returns a remainder of a division operation, and a, b, c, d, e, f, g, h, d1, d2, e1, e2, f1, f2, g1, g2, and g3 are constant numerical values. Some or all of the constant numerical values may also be configured by the network or specified in the technical standards.

An example expression for RE time location L0 where the RE time location changes on a frame and slot index within the frame is as follows:

$$L0=fn(dl,SFN,ns,cell\_ID,UE\_ID,max\_time\_location)= mod(a*(SFN*T+ns)+b*cell\_ID+ \\ c*UE\_ID+d*(SFN*T+ns+d1)*(cell\_ID+d2)+e* \\ (SFN*T+ns+e1)*(UE\_ID+e2)+f*(cell\_ID+f1)* \\ (UE\_ID+f2)+g*(SFN*T+ns+g1)*(cell\_ID+g2)* \\ (UE\_ID+g3)+h+dl,max\_time\_location+1).$$

Where L0 is the RE time location, fn( ) denotes a mathematical function, dl is the configured time domain parameter, ns is the slot index within one frame, cell_ID is the cell identifier, UE_ID is the UE identifier, max_time_location is the maximum number of OFDM symbols per slot, modO is a mathematical function that returns a remainder of a division operation, and a, b, c, d, e, f, g, h, d1, d2, e1, e2, f1, f2, g1, g2, and g3 are constant numerical values. Some or all of the constant numerical values may also be configured by the network or specified in the technical standards.

In addition to configuring CSI-RS period to the UE, the network may also configure the time domain parameter dl. Some or all of the constant numerical values a, b, c, d, e, f, g, h, d1, d2, e1, e2, f1, f2, g1, g2, and g3 may also be configured by the network or specified in the technical standards.

Furthermore, the RE frequency locations (e.g., first subcarrier of CSI-RS resources) may be expressed as a function of the configured frequency domain parameter db, resource identifying information (e.g., slot index ns within a frame), and network identifying information (e.g., cell identifier, UE identifier). The network may configure different UEs with different RE frequency locations in adjacent CSI-RS appearances. An example expression for RE frequency location B0 where the RE frequency location changes on a frame basis is as follows:

$$B0=fn(db,SFN,cell\_ID,UE\_ID,max\_freq\_location)= \\ mod(a*SFN+b*cell\_ID+c*UE\_ID+d*(SFN+ \\ d1)* (cell\_ID+d2)+e*(SFN+e1)*(UE\_ID+e2)+f* \\ (cell\_ID+f1)*(UE\_ID+f2)+g*(SFN+g1)*(cell\_ID+g2)*(UE\_ID+g3)+h+db, \\ max\_freq\_location+1).$$

Where B0 is the RE frequency location, fn( ) denotes a mathematical function, db is the configured frequency domain parameter, cell_ID is the cell identifier, UE_ID is the UE identifier, max_freq_location is the maximum number of subcarriers used by CSI-RS, modO is a mathematical function that returns a remainder of a division operation, and a, b, c, d, e, f, g, h, d1, d2, e1, e2, f1, f2, g1, g2, and g3 are constant numerical values. Some or all of the constant numerical values may also be configured by the network or specified in the technical standards.

An example expression for RE frequency location B0 where the RE frequency location changes on a CSI-RS period basis is as follows:

$$B0=fn(db,CPN,cell\_ID,UE\_ID,max\_freq\_location)= \\ mod(a*CPN+b*cell\_ID+c*UE\_ID+d*(CPN+ \\ d1)* (cell\_ID+d2)+e*(CPN+e1)*(UE\_ID+e2)+f* \\ (cell\_ID+f1)*(UE\_ID+f2)+g*(CPN+g1)*(cell\_ID+g2)*(UE\_ID+g3)+h+db, \\ max\_freq\_location+1).$$

Where B0 is the RE frequency location, fn( ) denotes a mathematical function, db is the configured frequency domain parameter, cell_ID is the cell identifier, UE_ID is the UE identifier, max_freq_location is the maximum number of subcarriers used by CSI-RS, modO is a mathematical function that returns a remainder of a division operation, and a, b, c, d, e, f, g, h, d1, d2, e1, e2, f1, f2, g1, g2, and g3 are constant numerical values. Some or all of the constant numerical values may also be configured by the network or specified in the technical standards.

An example expression for RE frequency location B0 where the RE frequency location changes on a frame and slot index within the frame is as follows:

$$B0=fn(db,\text{SFN},ns,\text{cell\_ID},\text{UE\_ID},\text{max\_freq\_location}) = \text{mod}(a*(\text{SFN}*T+ns)+b*\text{cell\_ID}+c*\text{UE\_ID}+d*(\text{SFN}*T+ns+d1)*(\text{cell\_ID}+d2)+e*(\text{SFN}*T+ns+e1)*(\text{UE\_ID}+e2)+f*(\text{cell\_ID}+f1)*(\text{UE\_ID}+f2)+g*(\text{SFN}*T+ns+g1)*(\text{cell\_ID}+g2)*(\text{UE\_ID}+g3)+h+db,\text{max\_freq\_location}+1).$$

Where B0 is the RE frequency location, fn( ) denotes a mathematical function, db is the configured frequency domain parameter, ns is the slot index within one frame, cell_ID is the cell identifier, UE_ID is the UE identifier, max_freq_location is the maximum number of subcarriers used by CSI-RS, modO is a mathematical function that returns a remainder of a division operation, and a, b, c, d, e, f, g, h, d1, d2, e1, e2, f1, f2, g1, g2, and g3 are constant numerical values. Some or all of the constant numerical values may also be configured by the network or specified in the technical standards.

As an illustrative example, both the slot offsets and the RE time or frequency locations (where slot offsets and RE time or frequency locations are examples of the relative location in the time domain and the frequency domain, respectively, of the CSI-RS for L3 mobility measurement resources) of the CSI-RS for L3 mobility measurement resources are specified to be a function of a configured parameter, resource identifying information (e.g., the SFN, the CPN, the symbol number within a slot, the time slot number within a frame, the RE number, the PRB number, the frequency band number, or the subcarrier number), network identifying information (e.g., cell identifier, or UE identifier), and so on, so that a cell can configure a UE or UE group a different relative location for the CSI-RS for L3 mobility measurement resources in adjacent frames or adjacent CSI-RS appearances. The slot offset and the RE time or frequency location may change in frequency, time, or both frequency and time. Both the slot offset and the RE time or frequency location may be bounded by maximum or minimum values.

The changing of both the slot offsets and the RE time or frequency locations as function of configured parameter, resource identifying information, and network identifying information allows the relative location of the CSI-RS resources to change between CSI-RS appearances with a greater degree of freedom in relative location change. The increase freedom may help to decrease the probability of collision.

FIG. 5A illustrates an example sequence of frames 500 of a 3GPP NR compliant communications system, highlighting a configurable and dynamic RE time location and a configurable and dynamic slot offset that are specified to be a function of configured parameters, resource identifying information, and network identifying information, where the RE time location within a slot changes as a function of SFN and slot number within a frame, and the slot offset changes on a per SFN basis. It is noted that in FIG. 5A, time is the horizontal axis and frequency is the vertical axis. As shown in FIG. 5A, the slot offset is a function of SFN, so the slot offset does not change within a single SFN, but may change between different SFNs. The CSI-RS resources in SFN 0 505, such as CSI-RS resource 510, have a slot offset of 0, while the CSI-RS resources in SFN 1 507, such as CSI-RS resource 512, have a slot offset of 2. The RE time locations are configured to be a function of SFN and slot index ns within a frame, and the four CSI-RS RE symbols (CSI-RS RE symbols 510, 512, 514, and 516) have relatively different location in each of the four CSI-RS appearances. Example expressions for the slot offset and RE time locations may be expressed as:

$$\text{slot\_offset}=fn(ds,\text{SFN},\text{cell\_ID},\text{UE\_ID},\text{max\_slot\_offset}); \text{ and}$$

$$L0=fn(dl,\text{SFN},ns,\text{cell\_ID},\text{UE\_ID},\text{max\_time\_location}).$$

Where slot_offset is a number of time slots relative to a beginning of a period to a time slot that includes the CSI-RS for L3 mobility measurement, L0 is the RE time location, fn( ) denotes a mathematical function, ns is the slot index within one frame, ds is the configured time domain parameter for the slot_offset, dl is the configured time domain parameter for the RE time location, cell_ID is the cell identifier, UE_ID is the UE identifier, max_time_location is the maximum number of OFDM symbols per slot, and max_slot_offset is the maximum number of slots in a CSI-RS period.

FIG. 5B illustrates an example sequence of frames 530 of a 3GPP NR compliant communications system, highlighting a configurable and dynamic RE time location and a configurable and dynamic slot offset that are specified to be a function of configured parameters, resource identifying information, and network identifying information, where the RE time location within a slot changes on a per SFN basis, and the slot offset changes on a per CSI-RS period basis. It is noted that in FIG. 5B, time is the horizontal axis and frequency is the vertical axis. As shown in FIG. 5B, the slot offset is a function of CSI-RS period, so the slot offset may change within a single SFN and between SFNs. The CSI-RS resources in SFN 0 535 have a slot offset of 0 (such as CSI-RS resource 544) in period 0 540 and a slot offset of 2 in period 1542 (such as CSI-RS resource 546). The RE time locations are configured to be a function of SFN, so the CSI-RS RE symbol locations within each SFN in FIG. 5B are the same (see CSI-RS resources 544 and 546, and CSI-RS resources 548 and 550), but different between SFNs. Example expressions for the slot offset and RE time locations may be expressed as:

$$\text{slot\_offset}=fn(ds,\text{CPN},\text{cell\_ID},\text{UE\_ID},\text{max\_slot\_offset}); \text{ and}$$

$$L0=fn(dl,\text{SFN},\text{cell\_ID},\text{UE\_ID},\text{max\_time\_location}).$$

Where slot_offset is a number of time slots relative to a beginning of a period to a time slot that includes the CSI-RS for L3 mobility measurement, L0 is the RE time location, fn( ) denotes a mathematical function, ds is the configured time domain parameter for the slot offset, dl is the configured time domain parameter for the RE time location, cell_ID is the cell identifier, UE_ID is the UE identifier, max_time_location is the maximum number of OFDM symbols per slot, and max_slot_offset is the maximum number of slots in a CSI-RS period.

FIG. 5C illustrates an example sequence of frames 560 of a 3GPP NR compliant communications system, highlighting a configurable and dynamic RE time or frequency location within a slot and with a configurable and dynamic slot offset that are both specified as a function of configured parameters, resource identifying information, and network identifying information, where the RE time and frequency location within a slot changes as a function of SFN and slot number within a frame, and slot offset changes on a per CSI-RS period basis. It is noted that in FIG. 5B, time is the horizontal axis and frequency is the vertical axis. As shown in FIG. 5B, both the RE time or frequency locations and the slot offset change within a single SFN. The CSI-RS resources in period 0 570 of SFN 0 565 (such as CSI-RS resource 574) have a slot offset of 0 and are located at the upper middle of the slot, while in period 1572 of SFN 0 565 (such as CSI-RS resource 576) have a slot offset of 2 and are located at the lower right of the slot. Similarly, CSI-RS resource 578 has a slot offset of 4 and is located in the upper left of the slot, while CSI-RS resource 580 has a slot offset of 1 and is located in the lower middle of the slot. Example expressions for the slot offset and RE time or frequency location may be expressed as:

slot_offset=*fn*(ds,CPN,cell_ID,UE_ID,max_slot_off-
set);

L0=*fn*(dl,SFN,ns,cell_ID,UE_ID,max_time_location);
and

B0=*fn*(db,SFN,ns,cell_ID,UE_ID,max_freq_loca-
tion).

Where slot_offset is a number of time slots relative to a beginning of a period to a time slot that includes the CSI-RS for L3 mobility measurement, L0 is the RE time location, B0 is the RE frequency location, fn( ) denotes a mathematical function, ds is the configured time domain parameter for the slot offset, dl is the configured time domain parameter for the RE time location, ns is the slot index within one frame, db is the configured frequency domain parameter for the RE frequency location, cell_ID is the cell identifier, UE_ID is the UE identifier, max_time_location is the maximum number of OFDM symbols per slot, max_freq_location is the maximum number of subcarriers used by CSI-RS, and max_slot_offset is the maximum number of slots in a CSI-RS period.

It is also noted that example expressions for configuring and dynamically changing the slot offset and RE time or frequency location presented herein are for discussion purposed only and that the example embodiments discussed here are operable with other ways for determining the slot offset and RE time or frequency locations. As an example, the slot offset may be configured and dynamically changed through the use of resource identification information, such as SFN, CPN, ns, or SFN and ns. As an example, the RE time or frequency location may be configured and dynamically changed through the use of resource identification information, such as SFN, CPN, ns, or SFN and ns. Therefore, the example expressions should not be construed as being limiting to the scope or spirit of the example embodiments.

Figure 6A:
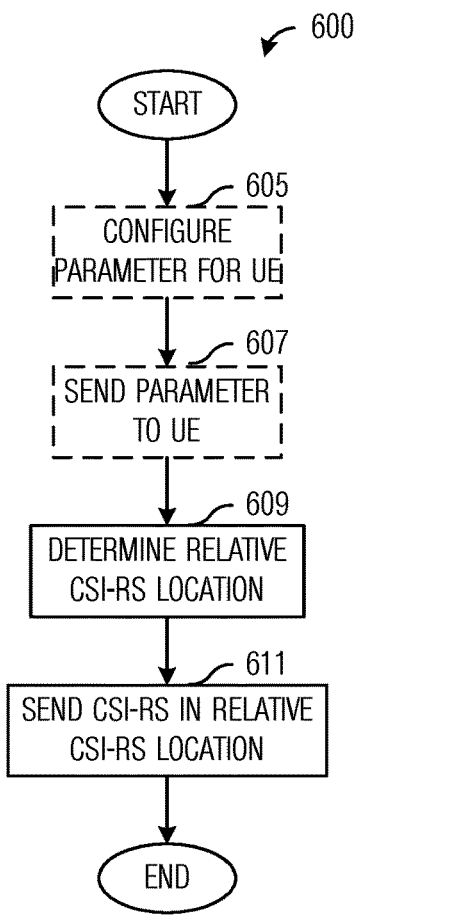
FIG. 6A illustrates a flow diagram of example operations occurring in an access node according to example embodiments described herein.

FIG. 6A illustrates a flow diagram of example operations 600 occurring in an access node. Operations 600 may be indicative of operations occurring in an access node as the access node configures dynamic location operation for CSI-RS for L3 mobility measurement and signals the CSI-RS in the locations.

Operations 600 optionally begin with the access node configuring a parameter(s) for the CSI-RS for L3 mobility measurement for a UE (block 605). Depending on the CSI-RS location (e.g., time location offset (such as slot offset, symbol offset, etc.), frequency location (such as PRB number, frequency band number, subcarrier number, etc.), or a combination thereof), the access node may configure one or more parameters. As an example, if the CSI-RS location is a time domain value such as a slot offset, the access node configures a time domain parameter ds. As another example, if the CSI-RS location is a time domain value such as symbol offset within a slot, the access node configures a time domain parameter dl. As another example, if the CSI-RS location is a frequency domain value such as a subcarrier location, the access node configures a frequency domain parameter db. If a parameter was configured for the CSI-RS, the access node sends the parameter to the UE (block 607).

The access node determines the relative CSI-RS locations (block 609). As an example, the access node determines the CSI-RS locations in accordance with the resource identifying information and the network identifying information. As another example, the access node determines the relative CSI-RS locations in accordance with the configured parameter(s), the resource identifying information, and the network identifying information. The access node sends the CSI-RS for L3 mobility measurement in the relative CSI-RS locations (block 611).

Figure 6B:
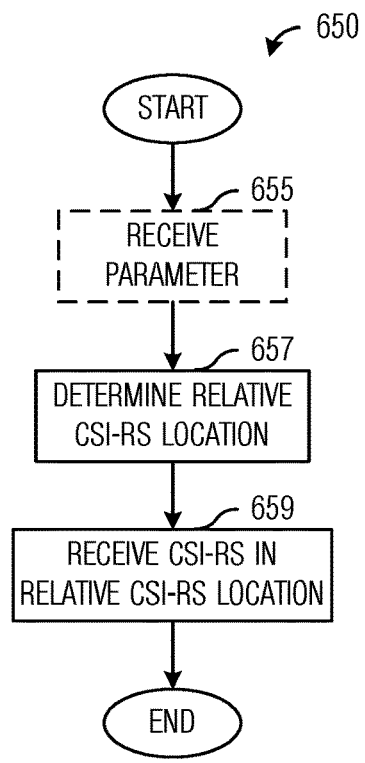
FIG. 6B illustrates a flow diagram of example operations occurring in a UE according to example embodiments described herein.

FIG. 6B illustrates a flow diagram of example operations 650 occurring in a UE. Operations 650 may be indicative of operations occurring in a UE as the UE receives CSI-RS for L3 mobility measurement in dynamic locations.

Operations 650 begin with the UE optionally receiving a parameter(s) configured by an access node (block 655). Depending on the relative CSI-RS location (e.g., time location offset (such as slot offset, symbol offset, etc.), frequency location (such as PRB number, frequency band number, subcarrier number, etc.), or a combination thereof), the UE may receive one or more configured parameters. The UE determines the relative CSI-RS locations (block 657). The UE may determine the relative CSI-RS locations in accordance with the resource identifying information and the network identifying information. The UE may determine the relative CSI-RS locations in accordance with the configured parameter(s), the resource identifying information, and the network identifying information.

As an example, consider a situation where the frame length is an integer multiple of CSI-RS periodicity, and that CPN=0 is aligned with SFN=0. Let M=frame length or CSI-RS periodicity. Then, at a current frame, the UE determines M CSI-RS locations for CPN_1=SFN*M, CPN_2=SFN*M+1, . . . , CPN_M=SFN*M+M−1. If it is assumed that prev_slot_offset is the previous slot offset, and slot_offset is the new slot_offset, then the UE is able to determine the next relative CSI-RS location of the CSI-RS for L3 mobility measurement resource is after X slots of the current CSI-RS for L3 mobility measurement resource, where X=CSI-RS_periodicity+slot_offset−prev_slot_offset.

The UE receives the CSI-RS for L3 mobility measurement in the determined relative CSI-RS location (block 659).

Measurement gaps (MGs) are silent periods scheduled by a cell serving a UE, during which there are no uplink or downlink data or control transmissions scheduled for the UE. The UE can use the MGs to make signal quality measurements of neighboring cells, for example. A MG configuration, specified by the cell, for example, includes a MG length (or duration), a MG repetition period, a MG offset, a MG timing advance, and so on. When configured for SSB based measurements, the MG is used for inter-frequency measurements; intra-frequency measurement when a SSB is not within a UE active bandwidth part (BWP); intra-frequency measurements in frequency range 2 (FR2) above 6 GHz to support possible receiver beamforming; and intra-frequency measurements with a different numerology between data or control transmissions and SSB. MGs may be extended to CSI-RS with similar use cases of MGs for SSB based measurement, namely: inter-frequency measurement; intra-frequency measurement on FR2 with receiver beamforming; and intra-frequency measurement when the numerology of the CSI-RS differs from that of the active downlink BWP.

According to an example embodiment, a MG dedicated for CSI-RS for L3 mobility measurement is configured to span the CSI-RS for L3 mobility measurement resource(s) of a neighbor cell. As an example, the MG spans a time interval that includes all CSI-RS resources transmitted by the neighbor cell. As an example, the MG spans a time interval that includes a subset of CSI-RS resource(s) of a neighbor cell. A MG dedicated for CSI-RS for L3 mobility measurement has the following configurable properties: window duration; timing offset, and periodicity. A neighbor cell may be the cell that is transmitting the CSI-RS for L3 mobility measurement. A neighbor cell may be another cell that is also a neighbor of the serving cell. Although the discussion focuses on CSI-RS for L3 mobility management, the example embodiments presented herein are operable for other types of CSI-RS, as well as other types of reference signals or signals that are not reference signals, such as control signals or data signals. Therefore, the focus on CSI-RS for L3 mobility management should not be construed as being limiting to the scope or spirit of the example embodiments.

Practice of the foregoing embodiments enable the design of a CSI-RS dedicated MG. Because the CSI-RS dedicated MG may be significantly shorter than other MGs, wasted resources associated with designing an unnecessarily long MG are prevented.

In an embodiment, the MG minimally spans a subset of the CSI-RS for L3 mobility measurement resource(s) of the neighbor cell, where minimally span means that there are no resources in the MG that does not span at least a portion of a CSI-RS for L3 mobility measurement resource of the neighbor cell. In an embodiment, the duration of the MG is equal to the duration of resources that minimally spans the subset of the CSI-RS for L3 mobility measurement resource(s) of the neighbor cell. In an embodiment, the duration of the MG may be substantially equal to the duration of resources that minimally spans the subset of the CSI-RS for L3 mobility measurement resource(s) of the neighbor cell. As used herein, substantially equal means that the duration of the MG is equal to the duration of resources that minimally spans the subset of the CSI-RS for L3 mobility measurement resource(s) of the neighbor cell plus or minus time differences due to differences in clocks, etc. In an embodiment, the MG spans the subset of the CSI-RS for L3 mobility measurement resource(s) of the neighbor cell with k or fewer resources on either side of the subset of the CSI-RS for L3 mobility measurement resource(s) of the neighbor cell, where k is a non-zero integer value that is specified by a technical standard, an operator of the communications system, or determined through historical information or collaboration between communications devices in the communications system. A k that is too large may result in wasted resources due to an excessively large MG, while a k that is too small may not permit the UE sufficient time to make the signal quality measurements while the subset of the CSI-RS for L3 mobility measurement resource(s) of the neighbor cell are being transmitted. In an embodiment, the duration of the MG is equal to the duration of resources that minimally spans the subset of the CSI-RS for L3 mobility measurement resource(s) of the neighbor cell with k or fewer resources on either side of the CSI-RS for L3 mobility measurement resource(s) of the neighbor cell. In an embodiment, the duration of the MG may be substantially equal to the duration of resources that minimally spans the subset of the CSI-RS for L3 mobility measurement resource(s) of the neighbor cell with k or fewer resources on either side of the CSI-RS for L3 mobility measurement resource(s) of the neighbor cell.

The MG may be as short as the subset of the CSI-RS for L3 mobility measurement resource(s) only, to minimize the duration of the MG. In a synchronous communications system where the timing of the CSI-RS for L3 mobility measurement of the neighbor cell can be obtained from serving cell timing, the symbols of the neighboring cells are aligned in time. Hence, the MG dedicated for the CSI-RS for L3 mobility measurement includes at least resource(s) that span the subset of the CSI-RS for L3 mobility measurement resource(s) of the neighbor cell to be measured. In an asynchronous communications system where the timing of the CSI-RS for L3 mobility measurement of the neighboring cell cannot be obtained from serving cell timing and should be obtained by detecting the SSB of the neighbor cell, so the symbols of neighboring cells might not be aligned in time. Therefore, the MG dedicated for the CSI-RS for L3 mobility measurement configured at the serving cell at least includes the resources that are fully or partially overlapped with the subset of the CSI-RS for L3 mobility measurement resource(s) of the neighbor cell to be measured.

In general, a CSI-RS for L3 mobility measurement (or other reference signals) may be persistent or semi-persistent, meaning that they are periodically transmitted. In between transmissions, other signals are transmitted. Therefore, a MG that spans an entirety of the CSI-RS for L3 mobility measurement may be excessively long, preventing the UE from communicating. In such a situation, the MG may be configured to span one or more individual instances of the CSI-RS for L3 mobility measurement resources, or a time interval that include one or more consecutive CSI-RS for L3 mobility measurement resources. In the situation where the entirety of the CSI-RS for L3 mobility measurement (or some other reference signal or signal that is not a reference signal) is short, the MG may be configured to span the entirety of the signal.

Within a MG, a UE is not expected to transmit uplink data or control or receive downlink data or control. In a synchronized communications system, where timing information of a neighbor cell's CSI-RS for L3 mobility measurement resources may be obtained from serving cell timing (e.g., primary serving cell or secondary serving cell), resources of the neighboring cells are aligned in time, so the UE is not expected to transmit or receive at least during the neighbor cell's CSI-RS for L3 mobility measurement resources. Instead, the UE is expected to measure the CSI-RS for L3 mobility measurement resources. In an asynchronous communications system where timing information of a neighbor cell's CSI-RS for L3 mobility measurement resources cannot be obtained from serving cell timing and should be obtained by detecting the SSB of the neighbor cell, resources of the neighboring cells are not aligned in time, so the UE is not expected to transmit or receive at least during resources that are fully or partially overlapped with the neighbor cell's CSI-RS for L3 mobility measurement resources. Instead, the UE is expected to measure the CSI-RS for L3 mobility measurement resources. In an asynchronous communications system, the timing information of the neighbor cell's CSI-RS for L3 mobility measurement resources may also be determined from SSBs transmitted by the primary serving cell or the secondary serving cell.

The duration of the MG dedicated for CSI-RS for L3 mobility measurement is configured to overlap with the neighbor cell's CSI-RS for L3 mobility measurement resources. Hence, the MG is much shorter than a MG dedicated for SSB based measurement, which avoids wasted resources. It is noted that the MG dedicated for CSI-RS for L3 mobility measurement has the same periodicity and slot offset as that of the CSI-RS for L3 mobility measurement of the neighbor cell.

According to an example embodiment, a MG dedicated for CSI-RS for L3 mobility measurement is configured to span at least a portion of a CSI-RS for L3 mobility measurement of neighbor cells. Neighboring cells configure their own CSI-RS for L3 mobility measurement by specifying RE locations within a slot, periodicity, slot offset, and so on, for example, and share the configuration information with their neighbors. The configuration information may be shared using a backhaul, for example. The serving cell configures a MG dedicated for CSI-RS for L3 mobility measurement for its UE based on the configuration information. In a situation where there are too many CSI-RSs for L3 mobility measurement for target neighboring cells, the serving cell may choose to configure the MG to cover a subset of the CSI-RSs for L3 mobility measurement. The serving cell may configure different MGs to cover different subsets of the CSI-RSs for L3 mobility measurement, so over time, MGs may be configured for all or most of the CSI-RSs for L3 mobility measurement of the neighboring cells. In a situation where a neighboring access node transmits a sequence of CSI-RS for L3 mobility measurement resources, the serving cell configures the MG to cover a subset of the sequence of CSI-RS for L3 mobility measurement resources. The subset may be a small number of CSI-RS for L3 mobility measurement resources, e.g., 1, 2, or 3, but other values are possible, to allow the UE sufficient time to make the measurements. Covering the entirety of the sequence of CSI-RS for L3 mobility measurement resources (or any large number (e.g., 10's, 100's, etc.) of CSI-RS for L3 mobility measurement resources) may preclude the UE from doing anything other than make measurements for an extended period of time.

According to an example embodiment, a portion of a CSI-RS for L3 mobility measurement is configured to occur within a MG. As an example, the serving cell configures a MG dedicated for CSI-RS for L3 mobility measurement for its UE. Configuration information for the MG is signaled to neighboring cells (using a backhaul, for example). The neighboring cells configure their respective CSI-RS for L3 mobility measurement to occur within the MG.

According to an example embodiment, a MG is repeated periodically. The MG may be periodic to allow for the UE to periodically make measurements of CSI-RS for L3 mobility measurement resources transmitted by neighbor cells, obtaining a view of potentially changing operating conditions. The periodic MG may also allow the UE to make multiple measurements and combine the measurements.

According to an example embodiment, in a situation where a neighboring access node transmits a sequence of CSI-RS for L3 mobility measurement resources, the serving cell configures the MG to cover a subset of the sequence of CSI-RS for L3 mobility measurement resources. The subset may be a small number of CSI-RS for L3 mobility measurement resources, e.g., 1, 2, or 3, but other values are possible, to allow the UE sufficient time to make the measurements. Covering the entirety of the sequence of CSI-RS for L3 mobility measurement resources (or any large number (e.g., 10's, 100's, etc.) of CSI-RS for L3 mobility measurement resources) may preclude the UE from doing anything other than make measurements for an extended period of time.

Figure 7A:
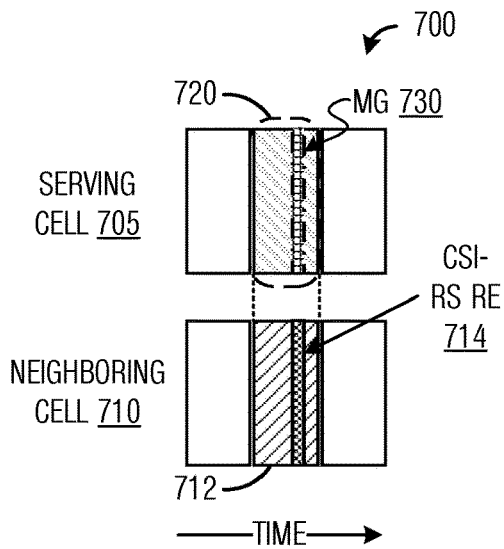
FIG. 7A illustrates communications system resources highlighting how a MG dedicated for CSI-RS for L3 mobility management is configured to span the CSI-RS for L3 mobility management resource(s) of a neighbor cell in a synchronous communications system according to example embodiments described herein.

FIG. 7A illustrates communications system resources 700 highlighting how a MG dedicated for CSI-RS for L3 mobility management is configured to span the CSI-RS for L3 mobility management resource(s) of a neighbor cell in a synchronous communications system. System resources for a serving cell are shown as resources 705, while resources 710 represent system resources for a neighboring cell. A symbol 712 is used by the neighboring cell to convey the CSI-RS for L3 mobility management, with the CSI-RS for L3 mobility management being contained in CSI-RS RE 714. Because the communications system is synchronous, the timing of symbol 712 may be obtained from serving cell timing, MG 720 comprises a single symbol duration that spans symbol 712. In an embodiment, the MG spans just the time domain resources correspond to the CSI-RS for L3 mobility management. As an example, a MG 730 in such an embodiment would be approximately equal to CSI-RS RE 714 in duration rather than MG 720. It is noted that in FIG. 7A, time is the horizontal axis and frequency is the vertical axis.

Figure 7B:
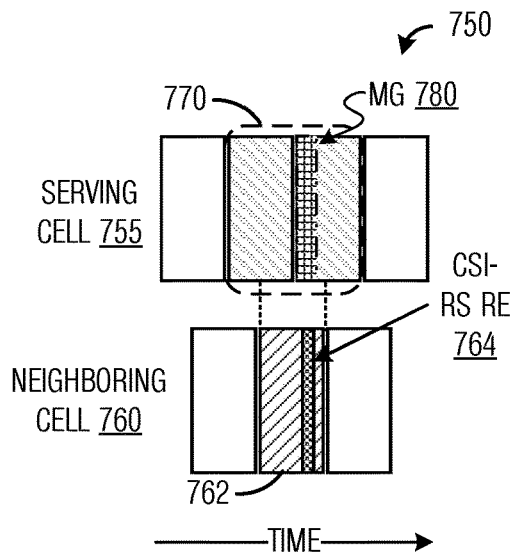
FIG. 7B illustrates communications system resources highlighting how a MG dedicated for CSI-RS for L3 mobility management is configured to span the CSI-RS for L3 mobility management resource(s) of a neighbor cell in an asynchronous communications system according to example embodiments described herein.

FIG. 7B illustrates communications system resources 750 highlighting how a MG dedicated for CSI-RS for L3 mobility management is configured to span the CSI-RS for L3 mobility management resource(s) of a neighbor cell in an asynchronous communications system. System resources for a serving cell are shown as resources 755, while resources 760 represent system resources for a neighboring cell. A symbol 762 is used by the neighboring cell to convey the CSI-RS for L3 mobility management, with the CSI-RS for L3 mobility management being contained in CSI-RS RE 764. Because the communications system is asynchronous, the timing of symbol 762 may not be obtained from serving cell timing, hence MG 770 comprises multiple symbol durations to span symbol 762. As shown in FIG. 7B, MG 770 comprises two symbol durations to minimally span symbol 762. As discussed previously, a MG may span more symbols than those required to minimally span the CSI-RS for L3 mobility measurement resource(s) of the neighboring cell. As an example, a MG may span k symbol durations on either side of the CSI-RS for L3 mobility measurement resource(s) of the neighboring cell to help ensure that sufficient time is provided to allow a UE to make the signal quality measurements. In an embodiment, the MG minimally spans just a specified number of time domain resources that correspond to the CSI-RS for L3 mobility management. As an example, a MG 780 in such an embodiment would be approximately equal to CSI-RS RE 764 plus the specified number of time domain resources in duration rather than MG 770. It is noted that in FIG. 7B, time is the horizontal axis and frequency is the vertical axis.

Figure 8A:
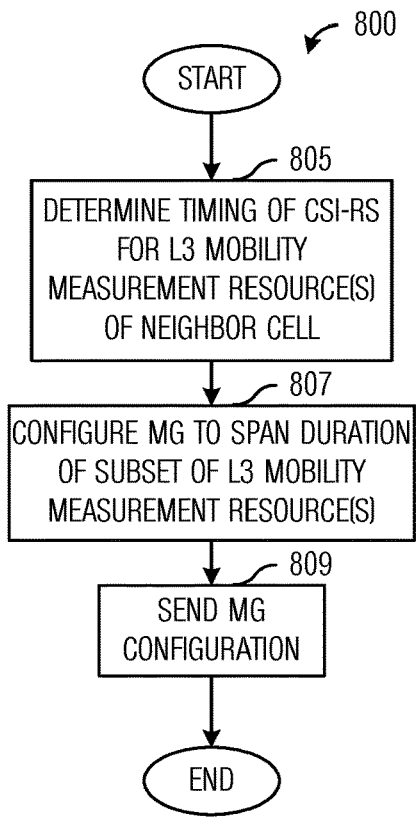
FIG. 8A illustrates a flow diagram of example operations occurring in a serving access node scheduling a MG dedicated for CSI-RS for L3 mobility measurement according to example embodiments described herein.

FIG. 8A illustrates a flow diagram of example operations 800 occurring in a serving access node scheduling a MG dedicated for CSI-RS for L3 mobility measurement. Operations 800 may be indicative of operations occurring in a serving access node as the serving access node schedules a MG dedicated for CSI-RS for L3 mobility measurement for a UE served by the serving access node.

Operations 800 begin with the serving access node determining the timing of CSI-RS for L3 mobility measurement resource(s) of a neighbor cell (block 805). The timing may be determined from serving cell timing, for example. The timing may be determined from the monitoring of SSBs transmitted by the neighbor cell, for example. The serving access node configures a MG in accordance with the timing (block 807). The MG may span the duration of a subset of the CSI-RS for L3 mobility measurement resource(s) of the neighbor cell. The serving access node sends the MG configuration to the UE (block 809).

Figure 8B:
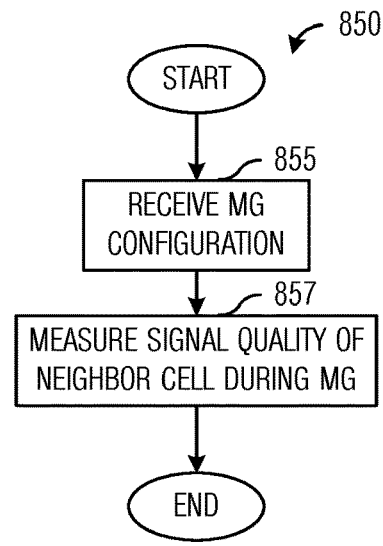
FIG. 8B illustrates a flow diagram of example operations occurring in a UE performing signal quality measurements during a MG dedicated for CSI-RS for L3 mobility measurement according to example embodiments described herein.

FIG. 8B illustrates a flow diagram of example operations 850 occurring in a UE performing signal quality measurements during a MG dedicated for CSI-RS for L3 mobility measurement. Operations 850 may be indicative of operations occurring in a UE as the UE performs signal quality measurements of a neighbor cell during a MG dedicated for CSI-RS for L3 mobility measurement resource(s) transmitted by the neighbor cell.

Operations 850 begin with the UE receiving a MG configuration (block 855). The MG configuration may include a duration of the MG, among other information. The UE measures the signal quality of transmissions made by the neighbor cell during the MG (block 857). As an example, the UE measures the signal quality in accordance with CSI-RS for L3 mobility measurement resource(s) transmitted by the neighbor cell.

According to an example embodiment, CSI-RS for L3 mobility measurement resources of a cell are multiplexed with a SSB of the cell, in different time or frequency locations of the SSB. In an embodiment, the CSI-RS for L3 mobility measurement resources of the cell are time division multiplexed (TDM) with the SSB of the cell. In another embodiment, the CSI-RS for L3 mobility measurement resources of the cell are frequency division multiplexed (FDM) with the SSB of the cell. In a first FDM scenario, between the CSI-RS for L3 mobility measurement resources and the SSB resources, the cell may, in the frequency domain, multiplex a SSB resource with a CSI-RS for L3 mobility measurement resource that is associated with it, where the association between the SSB resource and the CSI-RS for L3 mobility measurement resource is signaled in a RRC configuration message, and where there is a spatial QCL relationship between the SSB resource and the CSI-RS for L3 mobility measurement resources, for example. In such a situation, the presence of the spatial QCL relationship means that the resources may be detected with a single receive beam. In a second FDM scenario, between the CSI-RS for L3 mobility measurement resources and the SSB resources, the cell may, in the frequency domain, multiplex a SSB resource with a CSI-RS for L3 mobility measurement resource that does not have a spatial QCL relationship it. In such a situation, different receive beams are used to detect the SSB resource and the CSI-RS for L3 mobility measurement resource.

In a TDM deployment, the UE may first detect a SSB resource of the neighbor cell. Then, if the CSI-RS for L3 mobility measurement resource has an association with the SSB resource and if the two resources have a spatial QCL relationship, the UE uses the same receive beam to detect the CSI-RS for L3 mobility measurement resource. In a FDM deployment, the UE may use the same receive beam to detect both the SSB resource and the CSI-RS for L3 mobility measurement resource that is multiplexed with it.

Figure 9A:
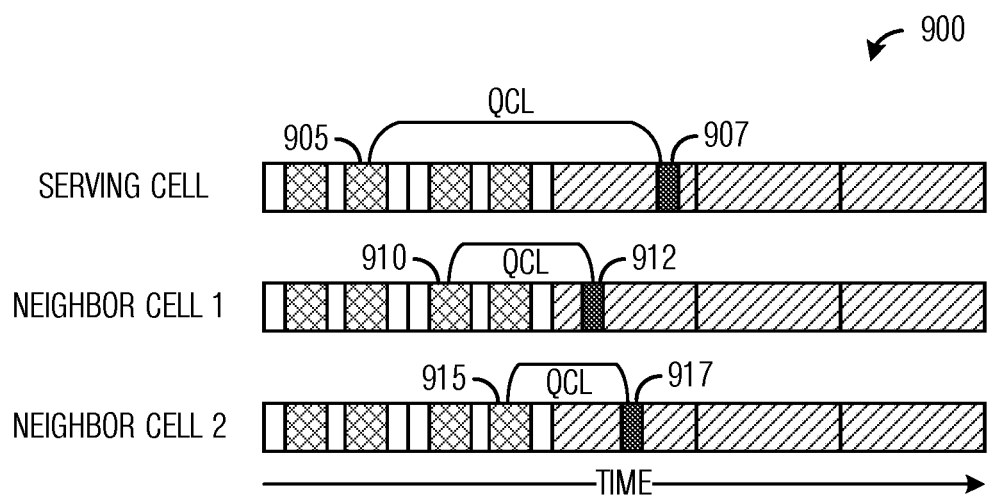
FIG. 9A illustrates an example sequence of frames highlighting the TDM of a SSB resource and a CSI-RS for L3 mobility measurement resource according to example embodiments described herein.

FIG. 9A illustrates an example sequence of frames 900 highlighting the TDM of a SSB resource and a CSI-RS for L3 mobility measurement resource. As shown in FIG. 9A, a serving cell multiplexes a SSB resource 905 and a CSI-RS for L3 mobility measurement resource 907 in the time domain when the two resources have an association and there is a spatial QCL relationship between the two resources. Similarly, resources 910 and 912 of a first neighbor cell and resources 915 and 917 of a second neighbor cell are multiplexed in the time domain when the respective resource pairs have an association and if there is a spatial QCL relationship between them. It is noted that the time separation between the associated resources may differ. It is noted that in FIG. 9A, time is the horizontal axis and frequency is the vertical axis.

Figure 9B:
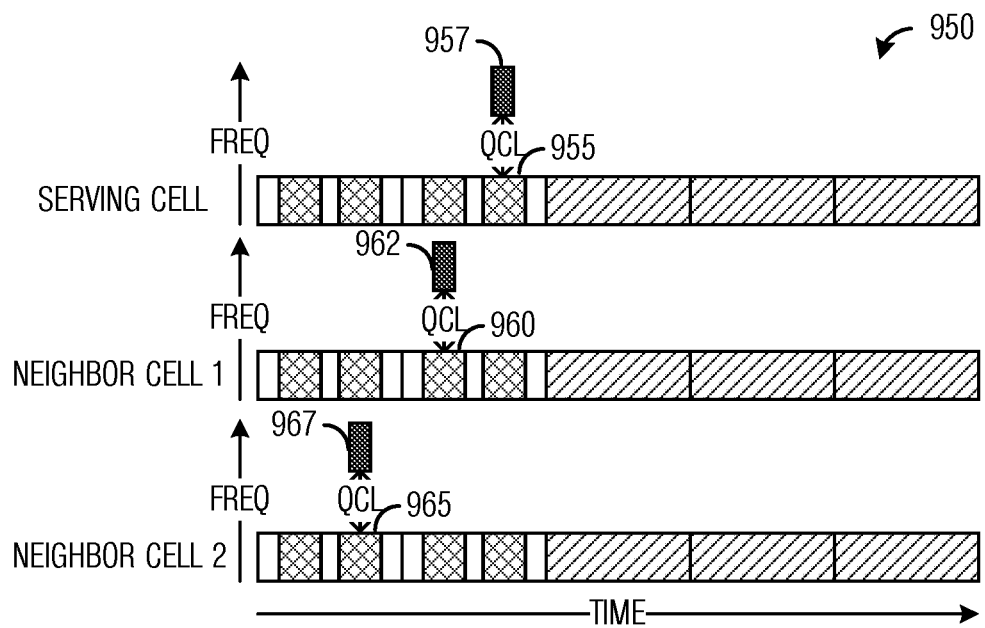
FIG. 9B illustrates an example sequence of frames highlighting the FDM of a SSB resource and a CSI-RS for L3 mobility measurement resource according to example embodiments described herein.

FIG. 9B illustrates an example sequence of frames 950 highlighting the FDM of a SSB resource and a CSI-RS for L3 mobility measurement resource. As shown in FIG. 9B, a serving cell multiplexes a SSB resource 955 and a CSI-RS for L3 mobility measurement resource 957 in the frequency domain when the two resources have an association and there is a spatial QCL relationship between the two resources. Similarly, resources 960 and 962 of a first neighbor cell and resources 965 and 967 of a second neighbor cell are multiplexed in the frequency domain when the respective resource pairs have an association and if there is a spatial QCL relationship between them. It is noted that the frequency separation between the associated resources may differ. It is noted that in FIG. 9B, time is the horizontal axis and frequency is the vertical axis.

Figure 10A:
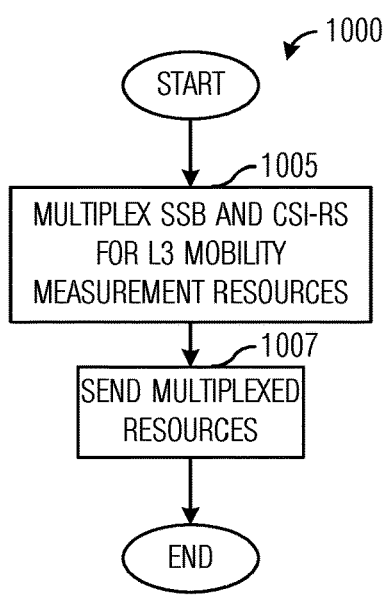
FIG. 10A illustrates a flow diagram of example operations occurring in an access node multiplexing SSB and CSI-RS for L3 mobility measurement resources according to example embodiments described herein.

FIG. 10A illustrates a flow diagram of example operations 1000 occurring in an access node multiplexing SSB and CSI-RS for L3 mobility measurement resources. Operations 1000 may be indicative of operations occurring at an access node as the access node multiplexes SSB and CSI-RS for L3 mobility measurement resources.

Operations 1000 begin with the access node multiplexing SSB and CSI-RS for L3 mobility measurement resources (block 1005). The access node is able to multiplex the resources when there is an association between the two and if there is a spatial QCL relationship between the two. The access node may use frequency domain or time domain multiplexing. The access node sends the multiplexed resources (block 1007).

Figure 10B:
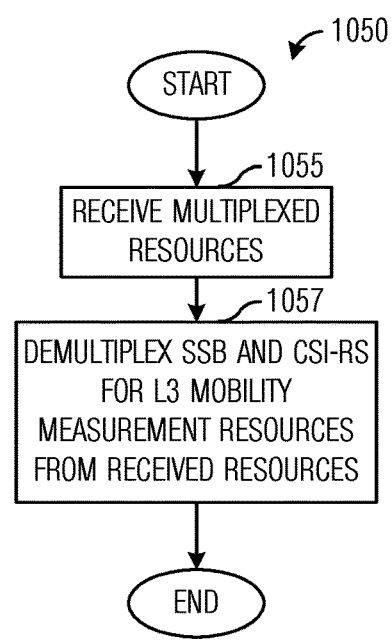
FIG. 10B illustrates a flow diagram of example operations occurring in a UE receiving multiplexed SSB and CSI-RS for L3 mobility measurement resources according to example embodiments described herein.

FIG. 10B illustrates a flow diagram of example operations 1050 occurring in a UE receiving multiplexed SSB and CSI-RS for L3 mobility measurement resources. Operations 1050 may be indicative of operations occurring at a UE as the UE receives multiplexed SSB and CSI-RS for L3 mobility measurement resources.

Operations 1050 begin with the UE receiving multiplexed SSB and CSI-RS for L3 mobility measurement resources (block 1055). The multiplexing may occur when there is an association between the two and if there is a spatial QCL relationship between the two. The multiplexing may be in the frequency domain or the time domain. The UE demultiplexes the multiplexed resources (block 1057).

Although the discussion above has focused on CSI-RS for L3 mobility measurement, the example embodiments presented herein are operable with any type of reference signal with limited duration and diversity, and fixed location, including other CSI-RSs. Therefore, the focus on CSI-RS for L3 mobility measurement should not be construed as being limiting to either the scope or spirit of the example embodiments. Furthermore, the discussion utilizes 3GPP NR terminology. However, the example embodiments are operable in any communications system that includes reference signals with limited duration and diversity, and fixed location. Therefore, the use of 3GPP NR terminology should not be construed as being limiting to either the scope or spirit of the example embodiments.

The following provides a non-limiting list of example embodiments of the present disclosure:

Example Embodiment 1

A method for operating an access node, the method comprising determining, by the access node, a timing of reference signal resources transmitted by a neighbor cell, configuring, by the access node, a MG with a MG duration that spans a duration of the reference signal resources transmitted by the neighbor cell, and sending, by the access node, the MG configuration to a UE.

Example Embodiment 2

The method of example embodiment 1, wherein determining the timing comprises determining the timing from serving cell timing.

Example Embodiment 3

The method of example embodiment 2, wherein the MG duration is equal to the duration of the reference signal resources transmitted by the neighbor cell.

Example Embodiment 4

The method of example embodiment 2, wherein the MG duration is equal to the duration of the reference signal resources transmitted by the neighbor cell plus a specified number of symbol durations on either side of the reference signal resources transmitted by the neighbor cell.

Example Embodiment 5

The method of example embodiment 1, wherein determining the timing comprises determining the timing from a SSB transmitted by the neighbor cell.

Example Embodiment 6

The method of example embodiment 5, wherein the MG duration is equal to a duration of all resources transmitted by the access node that overlaps the reference signal resources transmitted by the neighbor cell.

Example Embodiment 7

The method of example embodiment 5, wherein the MG duration is equal to a duration of all resources transmitted by the access node that overlaps the reference signal resources transmitted by the neighbor cell plus a specified number of symbol durations on either side of the reference signal resources transmitted by the neighbor cell.

Example Embodiment 8

An access node comprising a non-transitory memory storage comprising instructions, and one or more processors in communication with the memory storage. The one or more processors execute the instructions to perform the method according to the example embodiments 1-7.

Figure 11:
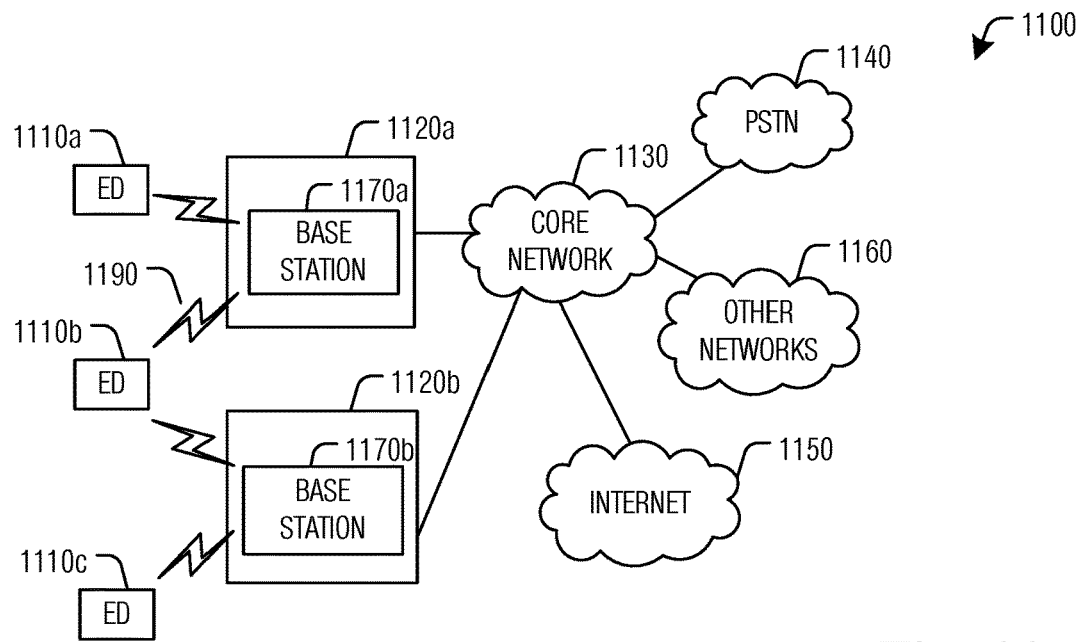
FIG. 11 illustrates an example communication system according to example embodiments described herein.

FIG. 11 illustrates an example communication system 1100. In general, the system 1100 enables multiple wireless or wired users to transmit and receive data and other content. The system 1100 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1100 includes electronic devices (ED) 1110a-1110c, radio access networks (RANs) 1120a-1120b, a core network 1130, a public switched telephone network (PSTN) 1140, the Internet 1150, and other networks 1160. While certain numbers of these components or elements are shown in FIG. 11, any number of these components or elements may be included in the system 1100.

The EDs 1110a-1110c are configured to operate or communicate in the system 1100. For example, the EDs 111a-1110c are configured to transmit or receive via wireless or wired communication channels. Each ED 1110a-1110c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1120a-1120b here include base stations 1170a-1170b, respectively. Each base station 1170a-1170b is configured to wirelessly interface with one or more of the EDs 1110a-1110c to enable access to the core network 1130, the PSTN 1140, the Internet 1150, or the other networks 1160. For example, the base stations 1170a-1170b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1110a-1110c are configured to interface and communicate with the Internet 1150 and may access the core network 1130, the PSTN 1140, or the other networks 1160.

In the embodiment shown in FIG. 11, the base station 1170a forms part of the RAN 1120a, which may include other base stations, elements, or devices. Also, the base station 1170b forms part of the RAN 1120b, which may include other base stations, elements, or devices. Each base station 1170a-1170b operates to transmit or receive wireless signals within a particular geographic region or area, sometimes referred to as a "cell." In some embodiments, multiple-input multiple-output (MIMO) technology may be employed having multiple transceivers for each cell.

The base stations 1170a-1170b communicate with one or more of the EDs 1110a-1110c over one or more air interfaces 1190 using wireless communication links. The air interfaces 1190 may utilize any suitable radio access technology.

It is contemplated that the system 1100 may use multiple channel access functionality, including such schemes as described above. In particular embodiments, the base stations and EDs implement 5G New Radio (NR), LTE, LTE-A. Of course, other multiple access schemes and wireless protocols may be utilized.

The RANs 1120a-1120b are in communication with the core network 1130 to provide the EDs 1110a-1110c with voice, data, application, Voice over Internet Protocol (VoIP), or other services. Understandably, the RANs 1120a-1120b or the core network 1130 may be in direct or indirect communication with one or more other RANs (not shown). The core network 1130 may also serve as a gateway access for other networks (such as the PSTN 1140, the Internet 1150, and the other networks 1160). In addition, some or all of the EDs 1110a-1110c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1150.

Although FIG. 11 illustrates one example of a communication system, various changes may be made to FIG. 11. For example, the communication system 1100 could include any number of EDs, base stations, networks, or other components in any suitable configuration.

Figure 12A:
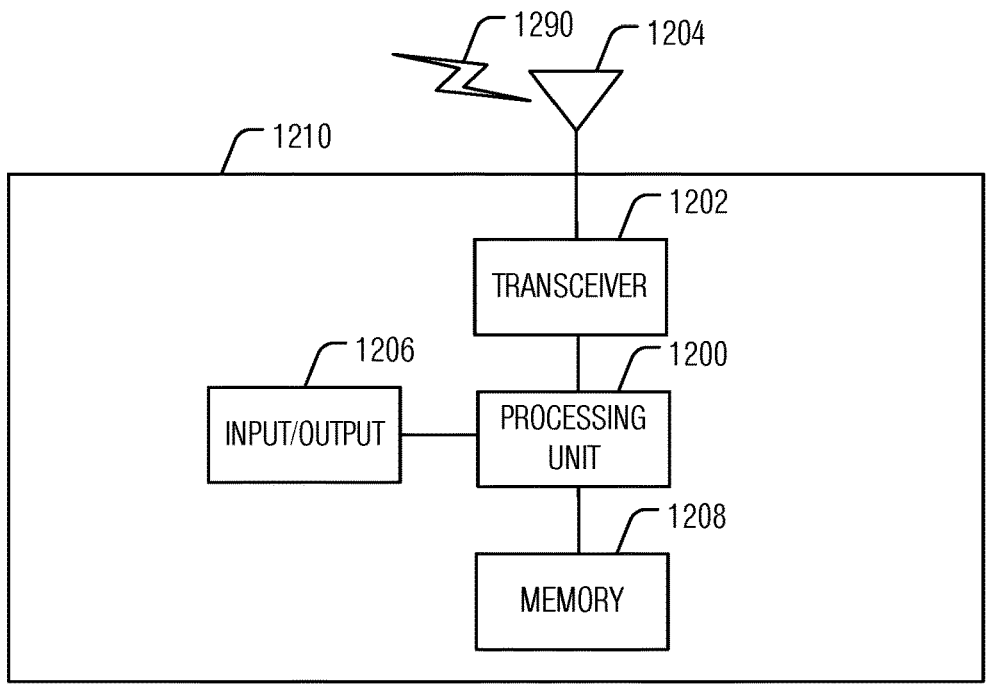
FIGS. 12A and 12B illustrate example devices that may implement the methods and teachings according to this disclosure.
Figure 12B:
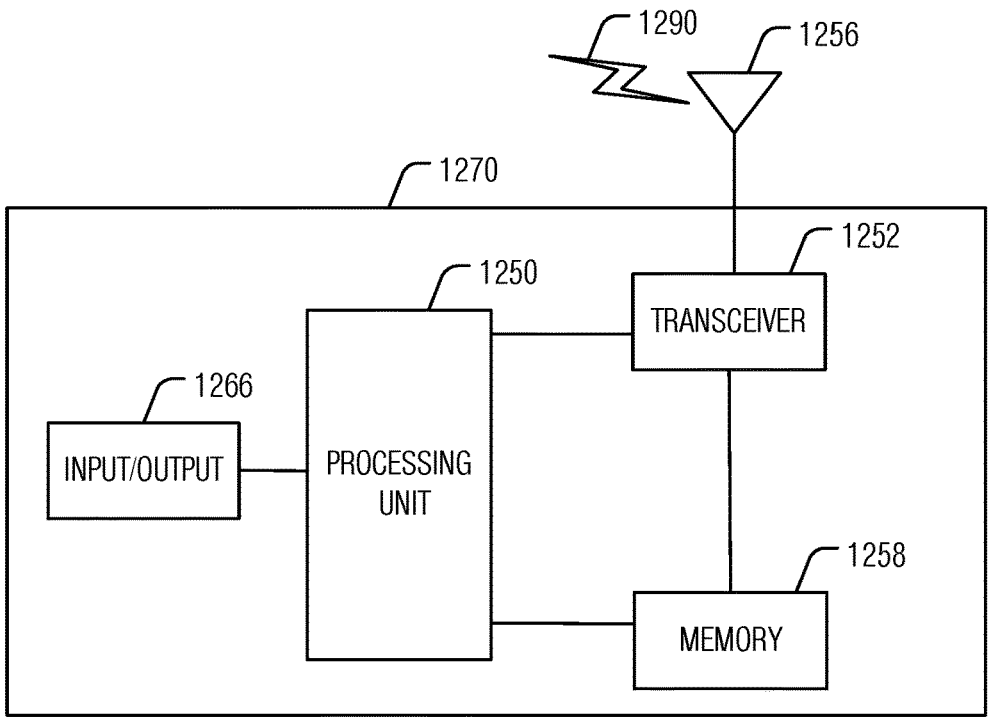

FIGS. 12A and 12B illustrate example devices that may implement the methods and teachings according to this disclosure. In particular, FIG. 12A illustrates an example ED 1210, and FIG. 12B illustrates an example base station 1270. These components could be used in the system 1100 or in any other suitable system.

As shown in FIG. 12A, the ED 1210 includes at least one processing unit 1200. The processing unit 1200 implements various processing operations of the ED 1210. For example, the processing unit 1200 could perform signal coding, data processing, power control, input/output processing, or any other functionality enabling the ED 1210 to operate in the system 1100. The processing unit 1200 also supports the methods and teachings described in more detail above. Each processing unit 1200 includes any suitable processing or computing device configured to perform one or more operations. Each processing unit 1200 could, for example, include a microprocessor, microcontroller, digital signal processor, field programmable gate array, or application specific integrated circuit.

The ED 1210 also includes at least one transceiver 1202. The transceiver 1202 is configured to modulate data or other content for transmission by at least one antenna or NIC (Network Interface Controller) 1204. The transceiver 1202 is also configured to demodulate data or other content received by the at least one antenna 1204. Each transceiver 1202 includes any suitable structure for generating signals for wireless or wired transmission or processing signals received wirelessly or by wire. Each antenna 1204 includes any suitable structure for transmitting or receiving wireless or wired signals. One or multiple transceivers 1202 could be used in the ED 1210, and one or multiple antennas 1204 could be used in the ED 1210. Although shown as a single functional unit, a transceiver 1202 could also be implemented using at least one transmitter and at least one separate receiver.

The ED 1210 further includes one or more input/output devices 1206 or interfaces (such as a wired interface to the Internet 1150). The input/output devices 1206 facilitate interaction with a user or other devices (network communications) in the network. Each input/output device 1206 includes any suitable structure for providing information to or receiving information from a user, such as a speaker, microphone, keypad, keyboard, display, or touch screen, including network interface communications.

In addition, the ED 1210 includes at least one memory 1208. The memory 1208 stores instructions and data used, generated, or collected by the ED 1210. For example, the memory 1208 could store software or firmware instructions executed by the processing unit(s) 1200 and data used to reduce or eliminate interference in incoming signals. Each memory 1208 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 12B, the base station 1270 includes at least one processing unit 1250, at least one transceiver 1252, which includes functionality for a transmitter and a receiver, one or more antennas 1256, at least one memory 1258, and one or more input/output devices or interfaces 1266. A scheduler, which would be understood by one skilled in the art, is coupled to the processing unit 1250. The scheduler could be included within or operated separately from the base station 1270. The processing unit 1250 implements various processing operations of the base station 1270, such as signal coding, data processing, power control, input/output processing, or any other functionality. The processing unit 1250 can also support the methods and teachings described in more detail above. Each processing unit 1250 includes any suitable processing or computing device configured to perform one or more operations. Each processing unit 1250 could, for example, include a microprocessor, microcontroller, digital signal processor, field programmable gate array, or application specific integrated circuit.

Each transceiver 1252 includes any suitable structure for generating signals for wireless or wired transmission to one or more EDs or other devices. Each transceiver 1252 further includes any suitable structure for processing signals received wirelessly or by wire from one or more EDs or other devices. Although shown combined as a transceiver 1252, a transmitter and a receiver could be separate components. Each antenna 1256 includes any suitable structure for transmitting or receiving wireless or wired signals. While a common antenna 1256 is shown here as being coupled to the transceiver 1252, one or more antennas 1256 could be coupled to the transceiver(s) 1252, allowing separate antennas 1256 to be coupled to the transmitter and the receiver if equipped as separate components. Each memory 1258 includes any suitable volatile or non-volatile storage and retrieval device(s). Each input/output device 1266 facilitates interaction with a user or other devices (network communications) in the network. Each input/output device 1266 includes any suitable structure for providing information to or receiving/providing information from a user, including network interface communications.

Figure 13:
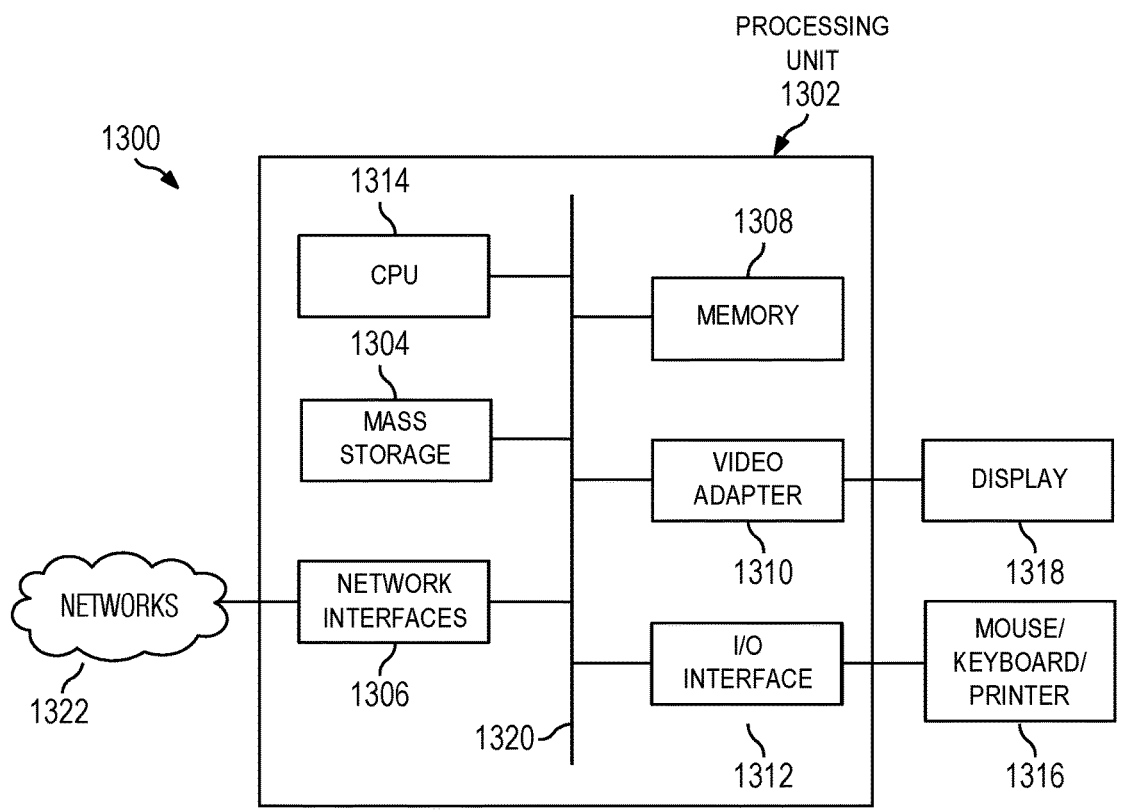
FIG. 13 is a block diagram of a computing system that may be used for implementing the devices and methods disclosed herein.

FIG. 13 is a block diagram of a computing system 1300 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1300 includes a processing unit 1302. The processing unit includes a central processing unit (CPU) 1314, memory 1308, and may further include a mass storage device 1304, a video adapter 1310, and an I/O interface 1312 connected to a bus 1320.

The bus 1320 may be one or more of any type of several bus architectures including a memory bus or memory controller, a peripheral bus, or a video bus. The CPU 1314 may comprise any type of electronic data processor. The memory 1308 may comprise any type of non-transitory system memory such as static random access memory (SRAM), dynamic random access memory (DRAM), synchronous DRAM (SDRAM), read-only memory (ROM), or a combination thereof. In an embodiment, the memory 1308 may include ROM for use at boot-up, and DRAM for program and data storage for use while executing programs.

The mass storage 1304 may comprise any type of non-transitory storage device configured to store data, programs, and other information and to make the data, programs, and other information accessible via the bus 1320. The mass storage 1304 may comprise, for example, one or more of a solid state drive, hard disk drive, a magnetic disk drive, or an optical disk drive.

The video adapter 1310 and the I/O interface 1312 provide interfaces to couple external input and output devices to the processing unit 1302. As illustrated, examples of input and output devices include a display 1318 coupled to the video adapter 1310 and a mouse, keyboard, or printer 1316 coupled to the I/O interface 1312. Other devices may be coupled to the processing unit 1302, and additional or fewer interface cards may be utilized. For example, a serial interface such as Universal Serial Bus (USB) (not shown) may be used to provide an interface for an external device.

The processing unit 1302 also includes one or more network interfaces 1306, which may comprise wired links, such as an Ethernet cable, or wireless links to access nodes or different networks. The network interfaces 1306 allow the processing unit 1302 to communicate with remote units via the networks. For example, the network interfaces 1306 may provide wireless communication via one or more transmitters/transmit antennas and one or more receivers/receive antennas. In an embodiment, the processing unit 1302 is coupled to a local-area network 1322 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit or module, or a configuring unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method comprising:
   determining, by an access node, a sequence of time/frequency resource locations of a reference signal in accordance with resource identifying information and network identifying information, wherein at least a first time domain distance between two consecutive resource locations in a first subset of the sequence of time/frequency resource locations is different from a second time domain distance between two consecutive resource locations in a second subset of the sequence of time/frequency resource locations, and wherein the reference signal comprises at least one of a channel state information reference signal (CSI-RS) for Layer 3 mobility measurement, a CSI-RS for beam management, a CSI-RS for channel state information (CSI) acquisition, a CSI-RS for time refinement, a CSI-RS for phase adjustment, or a CSI-RS for frequency adjustment; and
   sending, by the access node, the reference signal in accordance with the sequence of time/frequency resource locations.

2. The method of claim 1, wherein the resource identifying information comprises at least one of time resource identifying information or frequency resource identifying information.

3. The method of claim 2, wherein the time resource identifying information comprises at least one of a frame number, a period number, a symbol number within a slot, or a time slot number within a frame, and wherein the frequency resource identifying information comprises at least one of a physical resource block (PRB) number, frequency band number, or a subcarrier number.

4. The method of claim 1, wherein the network identifying information comprises at least one of a cell identifier, a user equipment (UE) identifier, a media access control (MAC) identifier, or a temporary mobile subscriber identity (TMSI).

5. The method of claim 1, wherein the sequence of time/frequency resource locations is further determined in accordance with a parameter, and wherein the method further comprises:
   configuring, by the access node, the parameter; and
   sending, by the access node, the parameter to a UE.

6. The method of claim 5, wherein each resource location in the sequence of time/frequency resource locations comprises a time domain location relative to a time domain reference point, and wherein the parameter comprises a time domain parameter.

7. The method of claim 6, wherein the time domain reference point is one of a start of a reference signal period, a specified frame number of a primary or a secondary serving cell, or a frame number zero of the primary or the secondary serving cell.

8. The method of claim 5, wherein each resource location in the sequence of time/frequency resource locations comprises a frequency domain location relative to a frequency domain reference point, and wherein the parameter comprises a frequency domain parameter.

9. The method of claim 8, wherein the frequency domain reference point is one of a reference PRB, a PRB zero that is the parameter in a serving cell configuration, a reference frequency location, or a synchronization signal block (SSB) location in a frequency domain.

10. The method of claim 5, wherein each resource location in the sequence of time/frequency resource locations comprises a time domain location relative to a time domain reference point, and a frequency domain location relative to a frequency domain reference point, and wherein the parameter comprises a time domain parameter and a frequency domain parameter.

11. The method of claim 1, wherein the reference signal is the CSI-RS for Layer 3 mobility measurement.

12. A method comprising:
   determining, by a user equipment (UE), a sequence of time/frequency resource locations of a reference signal in accordance with resource identifying information and network identifying information, wherein at least a first time domain distance between two consecutive resource locations in a first subset of the sequence of time/frequency resource locations is different from a second time domain distance between two consecutive resource locations in a second subset of the sequence of time/frequency resource locations, and wherein the reference signal comprises at least one of a channel state information reference signal (CSI-RS) for Layer 3 mobility measurement, a CSI-RS for beam management, a CSI-RS for channel state information (CSI)

acquisition, a CSI-RS for time refinement, a CSI-RS for phase adjustment, or a CSI-RS for frequency adjustment; and receiving, by the UE, the reference signal in accordance with the sequence of time/frequency resource locations.

13. The method of claim 12, wherein the resource identifying information comprises at least one of time resource identifying information or frequency resource identifying information.

14. The method of claim 13, wherein the time resource identifying information comprises at least one of a frame number, a period number, a symbol number within a slot, or a time slot number within a frame, and wherein the frequency resource identifying information comprises at least one of a physical resource block (PRB) number, a frequency band number, or a subcarrier number.

15. The method of claim 12, wherein the network identifying information comprises at least one of a cell identifier, a UE identifier, a media access control (MAC) identifier, or a temporary mobile subscriber identity (TMSI).

16. The method of claim 12, further comprising receiving, by the UE, a parameter from an access node, wherein the sequence of time/frequency resource locations is further determined in accordance with the parameter.

17. The method of claim 16, wherein each resource location in the sequence of time/frequency resource locations comprises time domain location relative to a time domain reference point, and wherein the parameter comprises a time domain parameter.

18. The method of claim 17, wherein the time domain reference point is one of a start of a reference signal period, a specified frame number of a primary or a secondary serving cell, or a frame number zero of the primary or the secondary serving cell.

19. The method of claim 16, wherein each resource location in the sequence of time/frequency resource locations comprises a frequency domain location relative to a frequency domain reference point, and wherein the parameter comprises a frequency domain parameter.

20. The method of claim 19, wherein the frequency domain reference point is one of a reference PRB, a PRB zero that is the parameter in a serving cell configuration, a reference frequency location, or a synchronization signal block (SSB) location in a frequency domain.

21. The method of claim 16, wherein each resource location in the sequence of time/frequency resource locations comprises a time domain location relative to a time domain reference point, and a frequency domain location relative to a frequency domain reference point, and wherein the parameter comprises a time domain parameter and a frequency domain parameter.

22. An access node comprising:
a non-transitory memory storage comprising instructions; and
one or more processors in communication with the non-transitory memory storage, wherein the one or more processors execute the instructions to:
determine a sequence of time/frequency resource locations of a reference signal in accordance with resource identifying information and network identifying information, wherein at least a first time domain distance between two consecutive resource locations in a first subset of the sequence of time/frequency resource locations is different from a second time domain distance between two consecutive resource locations in a second subset of the sequence of time/frequency resource locations, and wherein the reference signal comprises at least one of a channel state information reference signal (CSI-RS) for Layer 3 mobility measurement, a CSI-RS for beam management, a CSI-RS for channel state information (CSI) acquisition, a CSI-RS for time refinement, a CSI-RS for phase adjustment, or a CSI-RS for frequency adjustment, and
send the reference signal in accordance with the sequence of time/frequency resource locations.

23. The access node of claim 22, wherein the sequence of time/frequency resource locations is further determined in accordance with a parameter, and wherein the one or more processors further execute the instructions to configure the parameter, and send the parameter to a user equipment (UE).

24. The access node of claim 23, wherein each resource location in the sequence of time/frequency resource locations comprises a time domain location relative to a time domain reference point, and wherein the parameter comprises a time domain parameter.

25. The access node of claim 23, wherein each resource location in the sequence of time/frequency resource locations comprises a frequency domain location relative to a frequency domain reference point, and wherein the parameter comprises a frequency domain parameter.

26. The access node of claim 23, wherein each resource location in the sequence of time/frequency resource locations comprises a time domain location relative to a time domain reference point, and a frequency domain location relative to a frequency domain reference point, and wherein the parameter comprises a time domain parameter and a frequency domain parameter.

27. The access node of claim 22, wherein the resource identifying information comprises at least one of time resource identifying information or frequency resource identifying information.

28. The access node of claim 27, wherein the time resource identifying information comprises at least one of a frame number, a period number, a symbol number within a slot, or a time slot number within a frame, and wherein the frequency resource identifying information comprises at least one of a physical resource block (PRB) number, a frequency band number, or a subcarrier number.

29. The access node of claim 22, wherein the network identifying information comprises at least one of a cell identifier, a user equipment (UE) identifier, a media access control (MAC) identifier, or a temporary mobile subscriber identity (TMSI).

30. The access node of claim 22, wherein the reference signal is the CSI-RS for Layer 3 mobility measurement.

31. A user equipment (UE) comprising:
a non-transitory memory storage comprising instructions; and
one or more processors in communication with the non-transitory memory storage, wherein the one or more processors execute the instructions to:
determine a sequence of time/frequency resource locations of a reference signal in accordance with resource identifying information and network identifying information, wherein at least a first time domain distance between two consecutive resource locations in a first subset of the sequence of time/frequency resource locations is different from a second time domain distance between two consecutive resource locations in a second subset of the sequence of time/frequency resource locations, and wherein the reference signal comprises at least one of a channel state information reference signal (CSI- RS) for Layer 3 mobility measurement, a CSI-RS for beam management, a CSI-RS for channel state information (CSI) acquisition, a CSI-RS for time refinement, a CSI-RS for phase adjustment, or a CSI-RS for frequency adjustment, and receive the reference signal in accordance with the sequence of time/frequency resource locations.

32. The UE of claim 31, wherein the one or more processors further execute the instructions to receive a parameter from an access node, wherein the sequence of time/frequency resource locations is further determined in accordance with the parameter.

33. The UE of claim 32, wherein each resource location in the sequence of time/frequency resource locations comprises a time domain location relative to a time domain reference point, and wherein the parameter comprises a time domain parameter.

34. The UE of claim 32, wherein each resource location in the sequence of time/frequency resource locations comprises a frequency location relative to a frequency domain reference point, and wherein the parameter comprises a frequency domain parameter.

35. The UE of claim 32, wherein each resource location in the sequence of time/frequency resource locations comprises a time domain location relative to a time domain reference point, and a frequency location relative to a frequency domain reference point, and wherein the parameter comprises a time domain parameter and a frequency domain parameter.

36. The UE of claim 31, wherein the resource identifying information comprises at least one of time resource identifying information or frequency resource identifying information.

37. The UE of claim 36, wherein the time resource identifying information comprises at least one of a frame number, a period number, a symbol number within a slot, or a time slot number within a frame, and wherein the frequency resource identifying information comprises at least one of a physical resource block (PRB) number, a frequency band number, or a subcarrier number.

38. The UE of claim 31, wherein the network identifying information comprises at least one of a cell identifier, a UE identifier, a media access control (MAC) identifier, or a temporary mobile subscriber identity (TMSI).

* * * * *